(12) United States Patent
Walker, Jr. et al.

(10) Patent No.: US 9,383,482 B2
(45) Date of Patent: Jul. 5, 2016

(54) ANTIREFLECTIVE FILMS COMPRISING MICROSTRUCTURED SURFACE

(75) Inventors: Christopher B. Walker, Jr., St. Paul, MN (US); Christopher P. Tebow, Woodbury, MN (US); Tri D. Pham, Oakdale, MN (US); Steven H. Kong, Woodbury, MN (US); Joseph T. Aronson, Menomonie, WI (US); Kyle J. Lindstrom, Houlton, WI (US); Michael K. Gerlach, Huntsville, AL (US); Michelle L. Toy, North St. Paul, MN (US); Taun L. McKenzie, Hugo, MN (US); Anthony M. Renstrom, Maplewood, MN (US); Robert A. Yapel, Oakdale, MN (US); Mitchell A. F. Johnson, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 727 days.

(21) Appl. No.: 13/639,902

(22) PCT Filed: May 3, 2011

(86) PCT No.: PCT/US2011/034897
§ 371 (c)(1),
(2), (4) Date: Oct. 8, 2012

(87) PCT Pub. No.: WO2011/140018
PCT Pub. Date: Nov. 10, 2011

(65) Prior Publication Data
US 2013/0038939 A1    Feb. 14, 2013

Related U.S. Application Data

(60) Provisional application No. 61/332,231, filed on May 7, 2010, provisional application No. 61/349,318, filed on May 28, 2010.

(51) Int. Cl.
*G02B 1/118* (2015.01)
*G02B 5/02* (2006.01)

(52) U.S. Cl.
CPC ............... *G02B 1/118* (2013.01); *G02B 5/0242* (2013.01)

(58) Field of Classification Search
CPC ............ G02B 5/02–5/0294; G02B 1/11–1/118
USPC .......................... 359/577–590, 599, 601–615
See application file for complete search history.

(56) References Cited

U.S. PATENT DOCUMENTS

| 3,833,368 A | 9/1974 | Land |
| 4,000,356 A | 12/1976 | Weisgerber |

(Continued)

FOREIGN PATENT DOCUMENTS

| EP | 1720044 | 11/2006 |
| EP | 1793263 | 6/2007 |

(Continued)

OTHER PUBLICATIONS

Search Report ROC (Taiwan) Patent Application No. 100116059; Feb. 10, 2015; 1 page.

(Continued)

*Primary Examiner* — Bumsuk Won
*Assistant Examiner* — Jeffrey Madonna
(74) *Attorney, Agent, or Firm* — Carolyn A. Fischer

(57) ABSTRACT

The present invention concerns antireflective films comprising a high refractive index layer (60) and low refractive index layer (80) disposed on the high refractive index layer. The antireflective films have a microstructured surface (70) that can be derived from a microreplicated tool.

20 Claims, 15 Drawing Sheets

(56) References Cited

U.S. PATENT DOCUMENTS

| | | |
|---|---|---|
| 4,262,072 A | 4/1981 | Wendling |
| 5,175,030 A | 12/1992 | Lu |
| 5,183,597 A | 2/1993 | Lu |
| 5,433,973 A | 7/1995 | Wallack |
| 5,820,957 A | 10/1998 | Schroeder |
| 5,844,720 A | 12/1998 | Ohara |
| 6,329,058 B1 | 12/2001 | Arney |
| 6,340,404 B1 | 1/2002 | Oka |
| 6,376,590 B2 | 4/2002 | Kolb |
| 6,432,526 B1 | 8/2002 | Arney |
| 6,502,943 B2 | 1/2003 | Nakamura |
| 6,693,746 B1 | 2/2004 | Nakamura |
| 6,696,140 B2 | 2/2004 | Suzuki |
| 6,719,426 B2 | 4/2004 | Magarill |
| 6,778,240 B2 | 8/2004 | Nakamura |
| 7,008,066 B2 | 3/2006 | Suga |
| 7,074,463 B2 | 7/2006 | Jones |
| 7,101,618 B2 | 9/2006 | Coggio |
| 7,108,810 B2 | 9/2006 | Nakamura |
| 7,112,128 B1 | 9/2006 | Kirschhoffer |
| 7,182,681 B2 | 2/2007 | Kirschhoffer |
| 7,241,437 B2 | 7/2007 | Davidson |
| 7,282,272 B2 | 10/2007 | Jones |
| 7,323,514 B2 | 1/2008 | Jing |
| 7,328,628 B2 | 2/2008 | Laugharn |
| 7,328,638 B2 | 2/2008 | Gardiner |
| 7,350,442 B2 | 4/2008 | Ehnes |
| 7,445,733 B2 | 11/2008 | Arakawa |
| 7,472,999 B2 | 1/2009 | Suga |
| 7,547,467 B2 | 6/2009 | Olson |
| 7,615,283 B2 | 11/2009 | Radcliffe |
| 8,304,055 B2 | 11/2012 | Haga |
| 8,343,622 B2 | 1/2013 | Liu |
| 2002/0142133 A1 | 10/2002 | Matsunaga |
| 2003/0077437 A1 | 4/2003 | Nakamura |
| 2005/0064142 A1 | 3/2005 | Matsunaga |
| 2006/0147614 A1 | 7/2006 | Mizuno |
| 2006/0210726 A1 | 9/2006 | Jones |
| 2006/0215079 A1 | 9/2006 | Suzuki |
| 2007/0104896 A1 | 5/2007 | Matsunaga |
| 2007/0115407 A1 | 5/2007 | Richard |
| 2007/0121211 A1 | 5/2007 | Watanabe |
| 2007/0247568 A1 | 10/2007 | Suga |
| 2007/0286994 A1 | 12/2007 | Walker, Jr. |
| 2008/0014341 A1 | 1/2008 | Richter |
| 2008/0064133 A1 | 3/2008 | Lee |
| 2008/0212005 A1 | 9/2008 | Miyauchi |
| 2008/0221291 A1 | 9/2008 | Invie |
| 2008/0286527 A1 | 11/2008 | Haga |
| 2009/0015927 A1 | 1/2009 | Matsumura |
| 2009/0029054 A1 | 1/2009 | Yapel |
| 2009/0080082 A1 | 3/2009 | Matsunaga |
| 2009/0086326 A1 | 4/2009 | Hamamoto |
| 2009/0233048 A1 | 9/2009 | Murata |
| 2009/0310219 A1 | 12/2009 | Nagahama |
| 2010/0079868 A1 | 4/2010 | Asakura |
| 2010/0232021 A1 | 9/2010 | Walker, Jr. |
| 2010/0238686 A1 | 9/2010 | Weber |
| 2010/0245715 A1* | 9/2010 | Watanabe et al. ............... 349/64 |
| 2010/0246011 A1 | 9/2010 | Ohishi |
| 2010/0302479 A1 | 12/2010 | Aronson |
| 2011/0222263 A1 | 9/2011 | Weber |
| 2011/0222295 A1 | 9/2011 | Weber |
| 2011/0227008 A1 | 9/2011 | Jones |
| 2011/0228511 A1 | 9/2011 | Weber |
| 2011/0279997 A1 | 11/2011 | Weber |
| 2012/0064296 A1 | 3/2012 | Walker, Jr. |
| 2012/0113622 A1 | 5/2012 | Aronson |

FOREIGN PATENT DOCUMENTS

| | | |
|---|---|---|
| EP | 1962111 | 8/2008 |
| EP | 1972988 | 9/2008 |
| EP | 1990662 | 11/2008 |
| JP | 2003-075605 | 12/2003 |
| JP | 2005-092197 | 2/2008 |
| JP | 2009-086410 | 4/2009 |
| KR | 20100006748 | 1/2010 |
| KR | 20100056183 | 5/2010 |
| WO | WO 00/48037 | 8/2000 |
| WO | WO 01/22129 | 3/2001 |
| WO | WO 2006/030721 | 3/2006 |
| WO | WO 2007/146509 | 12/2007 |
| WO | WO 2007/146686 | 12/2007 |
| WO | WO 2008/020610 | 6/2008 |
| WO | WO 2008/069320 | 6/2008 |
| WO | WO 2008/075876 | 6/2008 |
| WO | WO 2008/112452 | 9/2008 |
| WO | WO 2008/121465 | 10/2008 |
| WO | WO 2008/144136 | 11/2008 |
| WO | WO 2008/144644 | 11/2008 |
| WO | WO 2009/014901 | 1/2009 |
| WO | WO 2010/002562 | 1/2010 |
| WO | WO 2010/074862 | 7/2010 |
| WO | WO 2010/141261 | 12/2010 |
| WO | WO 2010/141345 | 12/2010 |
| WO | WO 2011/028373 | 3/2011 |
| WO | WO 2011/056475 | 5/2011 |
| WO | WO 2011/094055 | 8/2011 |
| WO | WO 2011/140018 | 11/2011 |
| WO | WO 2011/149715 | 12/2011 |
| WO | WO 2012/018705 | 2/2012 |
| WO | WO 2012/074814 | 6/2012 |

OTHER PUBLICATIONS

Webber, "Method for the Measurement of Transparency of Sheet Materials", Journal of the Optical Society of America, Sep. 1957, vol. 47, No. 9, pp. 785-789.

S. Muskiant Ed, "Optical Coatings", *Optical Engineering*, vol. 6., *Optical Materials*, Chap. 7, p. 161-175, 1985.

Groh and Zimmerman, "What is the Lowest Refractive Index of an Organic Polymer?", *Macromolecules*, vol. 24 p. 6660-6663 (1991).

Billmeyer et al., "On the Measurement of Haze", Color Research and Application, vol. 10, No. 4, Winter 1985, pp. 219-224.

International Search Report PCT/US2011/034897 Sep. 19, 2011, 7 pgs.

Search Report for SG Application 201208120-4; Nov. 10, 2013; 4 pgs.

* cited by examiner

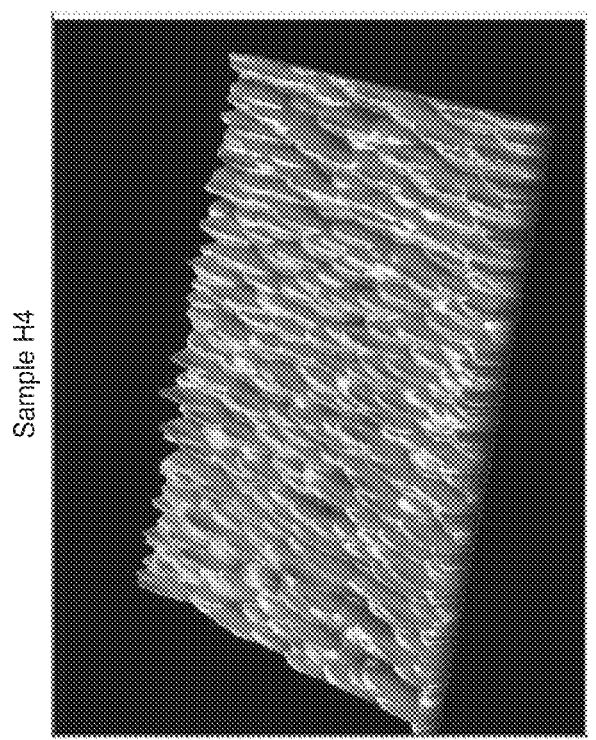
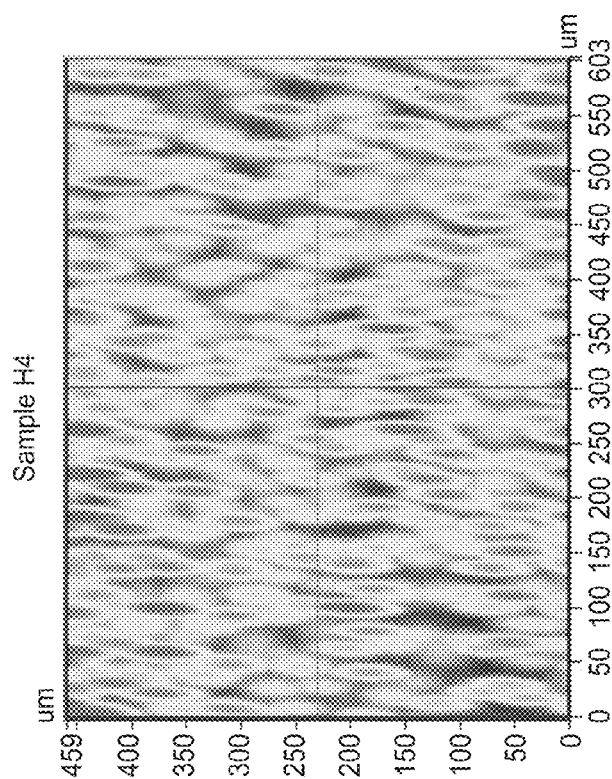
FIG. 9A
FIG. 9B

ANTIREFLECTIVE FILMS COMPRISING MICROSTRUCTURED SURFACE

BACKGROUND

Various matte films (also described as antiglare films) have been described. A matte film can be produced having an alternating high and low index layer. Such matte film can exhibit low gloss in combination with antireflection. However, in the absence of an alternating high and low index layer, such film would be exhibit antiglare, yet not antireflection.

As described at paragraph 0039 of US 2007/0286994, matte antireflective films typically have lower transmission and higher haze values than equivalent gloss films. For examples the haze is generally at least 5%, 6%, 7%, 8%, 9%, or 10% as measured according to ASTM D1003. Further gloss surfaces typically have a gloss of at least 130 as measured according to ASTM D 2457-03 at 60°; whereas matte surfaces have a gloss of less than 120.

There are several approaches for obtaining matte films.

For example, matte coating can be prepared by adding matte particles, such as described in U.S. Pat. No. 6,778,240.

Further, matte antireflective films can also be prepared by providing the high and low refractive index layers on a matte film substrate.

In yet another approach, the surface of an antiglare or an antireflective film can be roughened or textured to provide a matte surface. According to U.S. Pat. No. 5,820,957; "the textured surface of the anti-reflective film may be imparted by any of numerous texturing materials, surfaces, or methods. Non-limiting examples of texturing materials or surfaces include: films or liners having a matte finish, microembossed films, a microreplicated tool containing a desirable texturing pattern or template, a sleeve or belt, rolls such as metal or rubber rolls, or rubber-coated rolls."

SUMMARY

The present invention concerns antireflective films comprising a high refractive index layer and low refractive index layer disposed on the high refractive index layer. The antireflective films have a microstructured surface that can be derived from a microreplicated tool.

In some embodiments, the microstructured surface comprises a plurality of microstructures having a complement cumulative slope magnitude distribution such that at least 30% have a slope magnitude of at least 0.7 degrees and at least 25% have a slope magnitude less than 1.3 degrees.

In another embodiment, the antireflective film is characterized by a clarity of less than 90% and an average surface roughness (Ra) of at least 0.05 microns and no greater than 0.14 microns.

In another embodiment, the antireflective film is characterized by a clarity of less than 90% and an average maximum surface height (Rz) of at least 0.50 microns and no greater than 1.20 microns.

In another embodiment, the antireflective film is characterized by a clarity of less than 90% and the microstructured layer comprises peaks having a mean equivalent diameter of at least 5 microns and no greater than 30 microns.

In some embodiments, the antireflective film is free of embedded matte particles. In other embodiments, no greater than 50% of the microstructures comprise embedded matte particles.

The antireflective films generally have a clarity of at least 70% and a haze of no greater than 10%. Further, the antireflective film has an average photopic reflectance of less than 2% at a wavelength ranging from 500 nm to 625 nm.

In some embodiments, at least 30%, at least 35%, or at least 40% of the microstructures have a slope magnitude of less than 1.3 degrees.

In some embodiments, less than 15%, or less than 10%, or less than 5% of the microstructures have a slope magnitude of 4.1 degrees or greater. Further, at least 70% of the microstructures have a slope magnitude of at least 0.3 degrees.

In some embodiments having low "sparkle", the microstructures comprise peaks having a mean equivalent circular diameter (ECD) of at least 5 microns or at least 10 microns. Further, the mean ECD of the peaks is typically less than 30 microns or less than 25 microns. In some embodiments, the microstructures comprise peaks having a mean length of at least 5 microns or at least 10 microns. Further, the mean width of the microstructure peaks is typically at least 5 microns. In some embodiments, the mean width of the peaks is less than 15 microns.

In other embodiments, high refractive index compositions and low refractive index compositions are described from which the antireflective films described herein can be fabricated from.

BRIEF DESCRIPTION OF DRAWINGS

FIG. 9A is a two-dimensional surface profile of another exemplary microstructured surface (i.e. microstructured high refractive index layer H4);

FIG. 9B is a three-dimension surface profile of the exemplary microstructured surface of FIG. 9A;

DETAILED DESCRIPTION

Figure 1A:
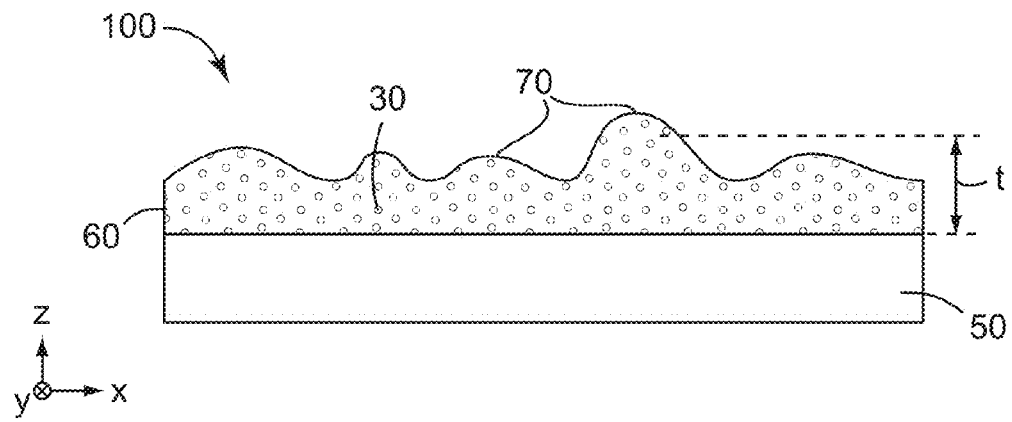
FIG. 1A is a schematic side-view of a matte film.

Presently described are matte (i.e. antiglare) films and antireflective films. With reference to FIG. 1A, the matte film 100 comprises a microstructured high refractive index (e.g. viewing surface) layer 60 typically disposed on a light transmissive (e.g. film) substrate 50. The substrate 50, as well as the matte or antireflective film, generally have a transmission of at least 85%, or 90%, and in some embodiments at least 91%, 92%, 93%, or greater.

The transparent substrate may be a film. The film substrate thickness typically depends on the intended use. For most applications, the substrate thicknesses is preferably less than about 0.5 mm, and more preferably about 0.02 to about 0.2 mm. Alternatively, the transparent film substrate may be an optical (e.g. illuminated) display through which test, graphics, or other information may be displayed. The transparent substrate may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices.

Figure 1B:
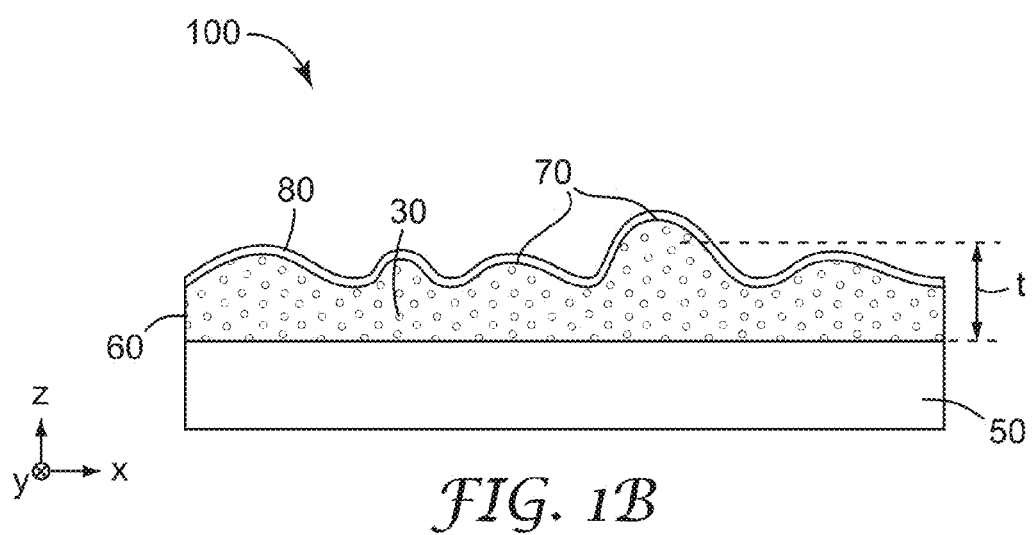
FIG. 1B is a schematic side-view of an antireflective film.

The antireflective film of FIG. 1B further comprises a low refractive index surface layer 80 disposed on the microstructured high refractive index layer. As illustrated in FIG. 1B, the exposed low refractive index (viewing) surface layer of the antireflective film also comprises a microstructured surface formed from the underlying microstructured high refractive index layer.

The high refractive index layer has a refractive index of at least about 1.60. The maximum refractive index of the high index layer is typically no greater than about 1.75 for coatings having high refractive index inorganic (e.g. zirconia) nanoparticles dispersed in a crosslinked organic material. The low refractive index layer has a refractive index less than a high refractive index layer. The difference in refractive index between the high refractive index layer and low refractive index layer is typically at least 0.10, or 0.15, or 0.2 or greater. The low refractive index layer typically has a refractive index of less than about 1.5, more typically of less than about 1.45, and even more typically less than about 1.42. The minimum refractive index of the low index layer is generally at least about 1.35.

The durable matte or antireflective film typically comprises a relatively thick high refractive index layer in combination with a relatively thin low refractive index layer. The high refractive index layer typically has an average thickness ("t") of at least 0.5 microns, preferably at least 1 micron, and more preferably at least 2 or 3 microns. The high refractive index layer typically has a thickness of no greater than 15 microns and more typically no greater than 4 or 5 microns. The low refractive index layer has an optical thickness of about ¼ wave. Such thickness is typically less than 0.5 microns, more typically less than about 0.2 microns and often about 90 nm to 110 nm. When a durable high refractive index layer is employed in combination with a durable low refractive index layer, a durable (e.g. two-layer) antireflective film can be provided in the absence of additional hardcoat layers. However, when durability of the matte or antireflective film is not required, the thickness of the high refractive index layer can be thinner.

Figure 2A:
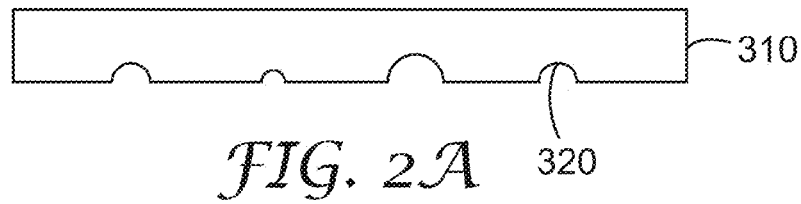
FIG. 2A is a schematic side-view of microstructure depressions.
Figure 2B:
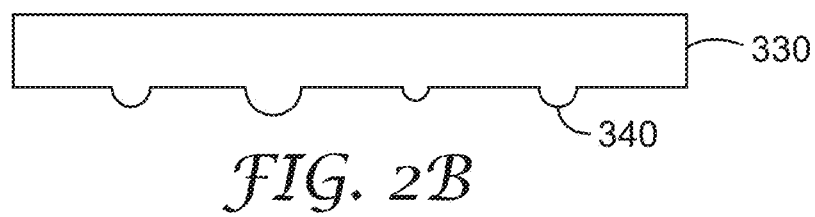
FIG. 2B is a schematic side-view of microstructure protrusions.

In some embodiments, the microstructures can be depressions. For example, FIG. 2A is a schematic side-view of microstructured (e.g. matte) layer 310 that includes depressed microstructures 320 or microstructure cavities. The tool surface from which the microstructured surface is formed generally comprises a plurality of depressions. The microstructures of the matte or antireflective film are typically protrusions. For example, FIG. 2B is a schematic side-view of a microstructured layer 330 including protruding microstructures 340. FIGS. 8A-10D depicts various microstructured surfaces comprising a plurality of microstructure protrusions.

Figure 3A:
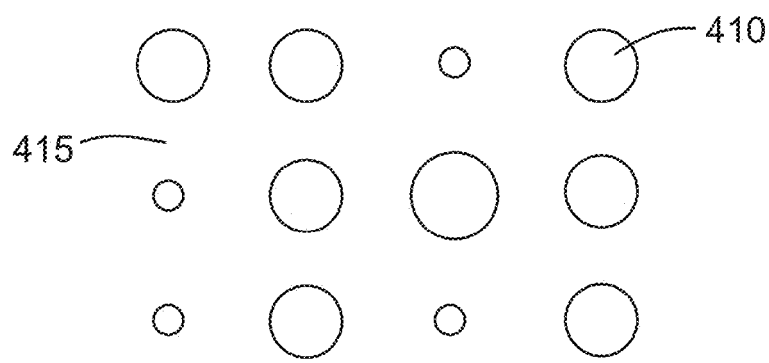
FIG. 3A is a schematic top-view of regularly arranged microstructures.
Figure 3B:
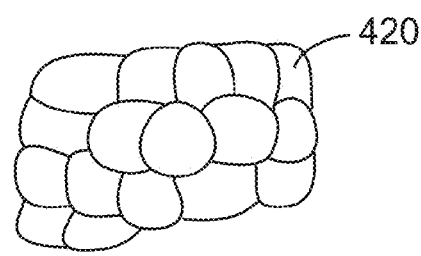
FIG. 3B is a schematic top-view of irregularly arranged microstructures.

In some embodiment, the microstructures can form a regular pattern. For example, FIG. 3A is a schematic top-view of microstructures 410 that form a regular pattern in a major surface 415. Typically however, the microstructures form an irregular pattern. For example, FIG. 3B is a schematic top-view of microstructures 420 that form an irregular pattern. In some cases, microstructures can form a pseudo-random pattern that appears to be random.

Figure 4:
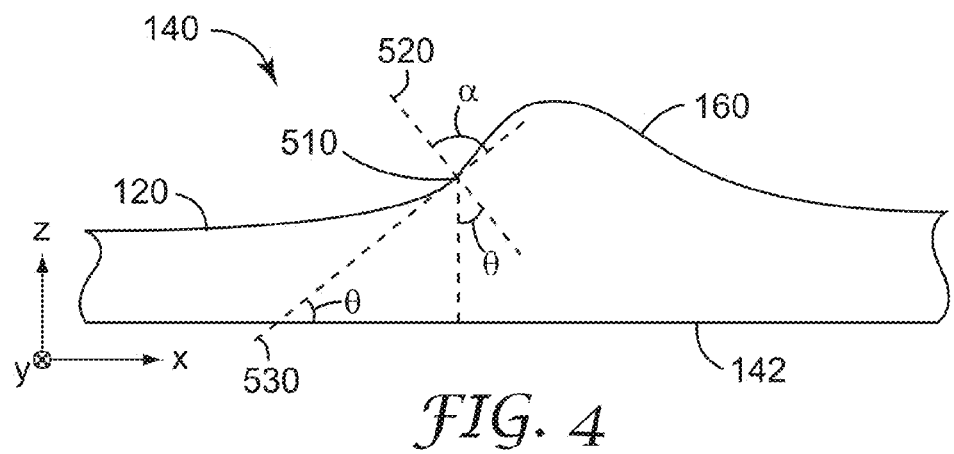
FIG. 4 is a schematic side-view of a microstructure.

A (e.g. discrete) microstructure can be characterized by slope. FIG. 4 is a schematic side-view of a portion of a microstructured (e.g. matte) layer 140. In particular, FIG. 4 shows a microstructure 160 in major surface 120 and facing major surface 142. Microstructure 160 has a slope distribution across the surface of the microstructure. For example, the microstructure has a slope θ at a location 510 where θ is the angle between normal line 520 which is perpendicular to the microstructure surface at location 510 (α=90 degrees) and a tangent line 530 which is tangent to the microstructure surface at the same location. Slope θ is also the angle between tangent line 530 and major surface 142 of the matte layer.

In general, the microstructures of the high refractive index layer and antireflective film can typically have a height distribution. In some embodiments, the mean height (as measured according to the test method described in the examples) of microstructures is not greater than about 5 microns, or not greater than about 4 microns, or not greater than about 3 microns, or not greater than about 2 microns, or not greater than about 1 micron. The mean height is typically at least 0.1 or 0.2 microns.

In some embodiments, the microstructures are substantially free of (e.g. inorganic oxide or polystyrene) matte particles. However, even in the absence of matte particles, the microstructures 70 and high refractive index layer typically comprise (e.g. zirconia) nanoparticles 30, as depicted in FIG. 1A.

The size of the nanoparticles is chosen to avoid significant visible light scattering. It may be desirable to employ a mixture of inorganic oxide particle types to optimize an optical or material property and to lower total composition cost. The surface modified colloidal nanoparticles can be inorganic oxide particles having a (e.g. unassociated) primary particle size or associated particle size of at least 1 nm or 5 nm. The primary or associated particle size is generally less than 100 nm, 75 nm, or 50 nm. Typically the primary or associated particle size is less than 40 nm, 30 nm, or 20 nm. It is preferred that the nanoparticles are unassociated. Their measurements can be based on transmission electron miscroscopy (TEM). Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Due to the substantially smaller size of nanoparticles, such nanoparticles do not form a microstructure. Rather, the microstructures comprise a plurality of nanoparticles. Although not shown, the low index layer 80 typically also comprises (e.g. silica) nanoparticles.

In other embodiments, a portion of the microstructures of the high refractive index layer comprise embedded matte particles.

Matte particles typically have an average size that is greater than about 0.25 microns (250 nanometers), or greater than about 0.5 microns, or greater than about 0.75 microns, or greater than about 1 micron, or greater than about 1.25 microns, or greater than about 1.5 microns, or greater than about 1.75 microns, or greater than about 2 microns. Smaller matte particles are typically for antireflective films that comprise a relatively thin high refractive index layer. However for embodiments wherein the high refractive index layer is thicker, the matte particles may have an average size up to 5 microns or 10 microns. The concentration of matte particles may range from at least 1 or 2 wt-% to about 5, 6, 7, 8, 9, or 10 wt-% or greater.

Figure 5:
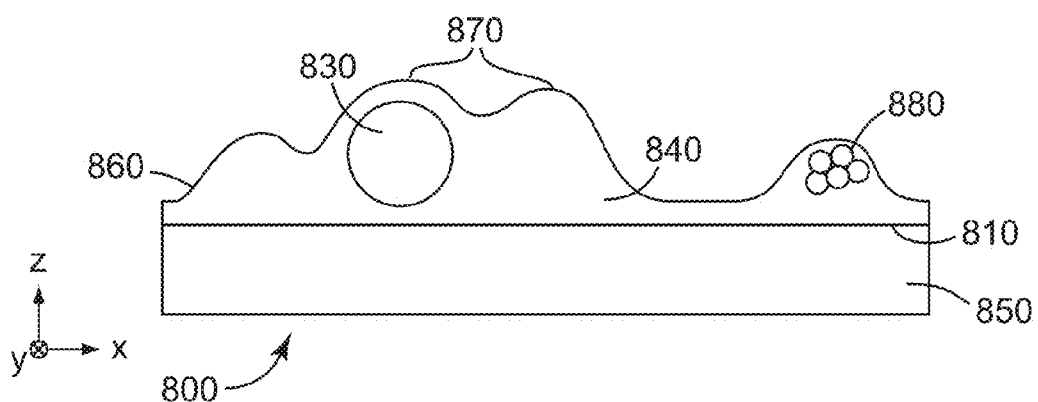
FIG. 5 is a schematic side-view of an optical film comprising a portion of microstructures comprising embedded matte particles.

FIG. 5 is a schematic side-view of an optical film 800 that includes a matte layer 860 disposed on a substrate 850. Matte layer 860 includes a first major surface 810 attached to substrate 850 and a plurality of matte particles 830 and/or matte particle agglomerates dispersed in a polymerized binder 840. A substantial portion, such as at least about 50%, or at least about 60%, or at least about 70%, or at least about 80%, or at least about 90%, of microstructures 870 lack the presence of a matte particle 830 or matte particle agglomerate 880. Thus such microstructures are free of (e.g. embedded) matte particles. It is surmised that the presence of (e.g. silica or $CaCO_3$) matte particles may provide improved durability even when the presence of such matte particles is insufficient to provide the desired antireflection, clarity, and haze properties as will subsequently be described. However, due to the relatively large size of matte particles, it can be difficult to maintain matte particles uniformly dispersed in a coating composition. This can cause variations in the concentration of matte particles applied (particularly in the case of web coating), which in turn causes variations in the matte properties.

For embodiments wherein at least a portion of the microstructures comprise an embedded matte particle or agglomerated matte particle, the average size of the matte particles is typically sufficiently less than the average size of microstructures (e.g. by at least a factor of about 2 or more) such that the matte particle is surrounded by the polymerizable resin composition of the microstructured layer as depicted in FIG. 5.

When the matte layer includes matte particles, then the matte layer has an average thickness "t" that is greater than the average size of the particles by at least about 0.5 microns, or at least about 1 micron, or at least about 1.5 microns, or at least about 2 microns, or at least about 2.5 microns, or at least about 3 microns.

Alternatively, or in addition thereto, the low refractive index layer may comprise matte particles.

The microstructured surface can be made using any suitable fabrication method. The microstructures are generally fabricated using microreplication from a tool by casting and curing a polymerizable resin composition in contact with a tool surface such as described in U.S. Pat. No. 5,175,030 (Lu et al.) and U.S. Pat. No. 5,183,597 (Lu). The tool may be fabricated using any available fabrication method, such as by using engraving or diamond turning. Exemplary diamond turning systems and methods can include and utilize a fast tool servo (FTS) as described in, for example, PCT Published Application No. WO 00/48037, and U.S. Pat. Nos. 7,350,442 and 7,328,638, the disclosures of which are incorporated by reference thereto.

Figure 6:
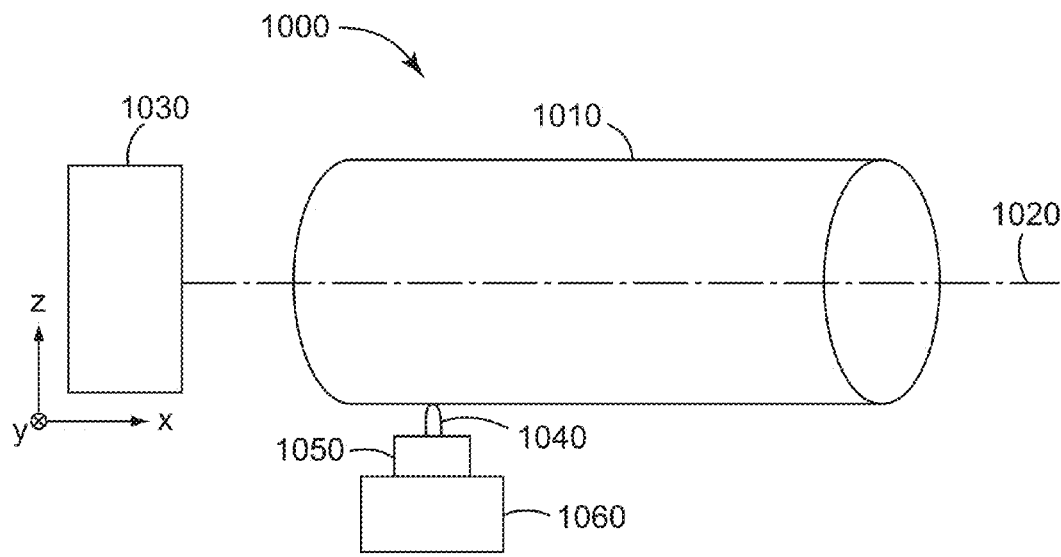
FIG. 6 is a schematic side-view of a cutting tool system.

FIG. 6 is a schematic side-view of a cutting tool system 1000 that can be used to cut a tool which can be microreplicated to produce microstructures 160 and matte layer 140. Cutting tool system 1000 employs a thread cut lathe turning process and includes a roll 1010 that can rotate around and/or move along a central axis 1020 by a driver 1030, and a cutter 1040 for cutting the roll material. The cutter is mounted on a servo 1050 and can be moved into and/or along the roll along the x-direction by a driver 1060. In general, cutter 1040 can be mounted normal to the roll and central axis 1020 and is driven into the engraveable material of roll 1010 while the roll is rotating around the central axis. The cutter is then driven parallel to the central axis to produce a thread cut. Cutter 1040 can be simultaneously actuated at high frequencies and low displacements to produce features in the roll that when microreplicated result in microstructures 160.

Servo 1050 is a fast tool servo (FTS) and includes a solid state piezoelectric (PZT) device, often referred to as a PZT stack, which rapidly adjusts the position of cutter 1040. FTS 1050 allows for highly precise and high speed movement of cutter 1040 in the x-, y- and/or z-directions, or in an off-axis direction. Servo 1050 can be any high quality displacement servo capable of producing controlled movement with respect to a rest position. In some cases, servo 1050 can reliably and repeatably provide displacements in a range from 0 to about 20 microns with about 0.1 micron or better resolution.

Driver 1060 can move cutter 1040 along the x-direction parallel to central axis 1020. In some cases, the displacement resolution of driver 1060 is better than about 0.1 microns, or better than about 0.01 microns. Rotary movements produced by driver 1030 are synchronized with translational movements produced by driver 1060 to accurately control the resulting shapes of microstructures 160.

The engraveable material of roll 1010 can be any material that is capable of being engraved by cutter 1040. Exemplary roll materials include metals such as copper, various polymers, and various glass materials.

Figure 7A:
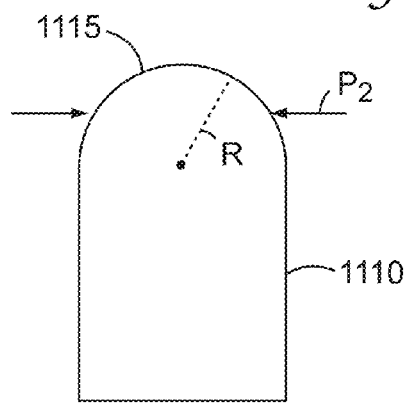
FIGS. 7A-7D are schematic side-views of various cutters.

Cutter 1040 can be any type of cutter and can have any shape that may be desirable in an application. For example, FIG. 7A is a schematic side-view of a cutter 1110 that has an arc-shape cutting tip 1115 with a radius "R". In some cases, the radius R of cutting tip 1115 is at least about 100 microns, or at least about 150 microns, or at least about 200 microns. In some embodiments, the radius R of the cutting tip is or at least about 300 microns, or at least about 400 microns, or at least about 500 microns, or at least about 1000 microns, or at least about 1500 microns, or at least about 2000 microns, or at least about 2500 microns, or at least about 3000 microns.

Figure 7B:
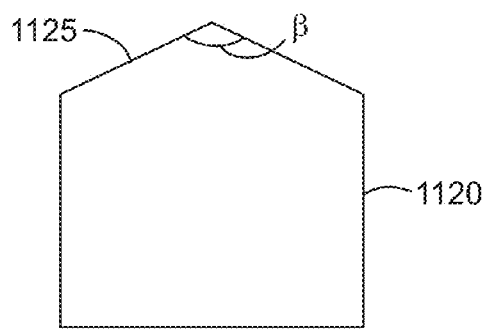
Figure 7C:
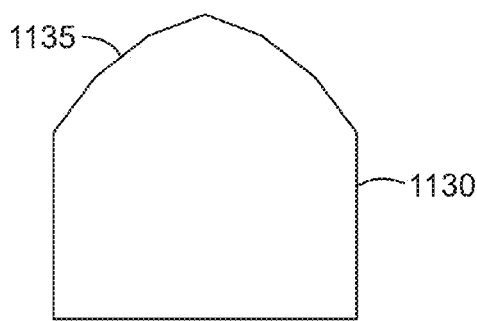
Figure 7D:
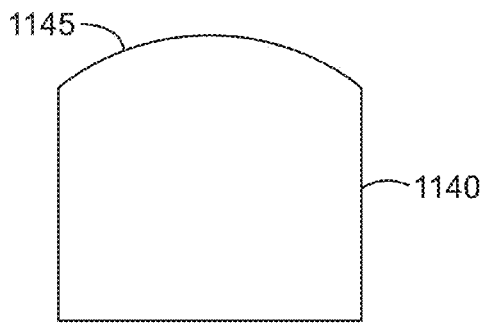
Figure 8B:
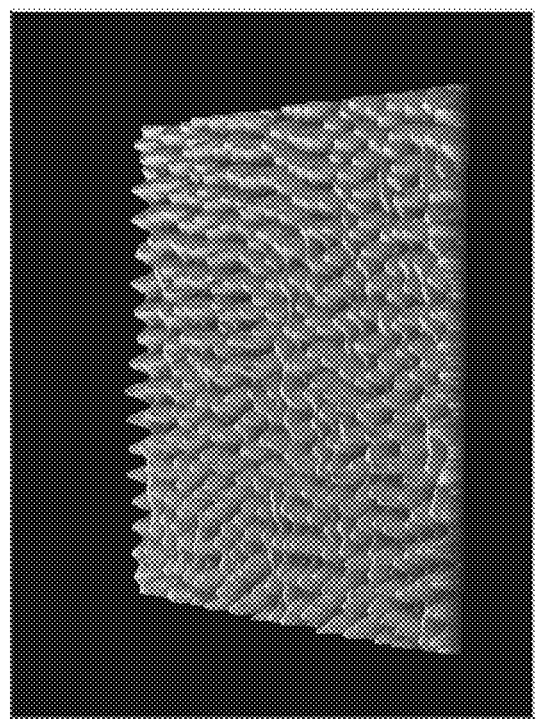
FIG. 8B is a three-dimension surface profile of the exemplary microstructured surface of FIG. 8A.
Figure 8A:
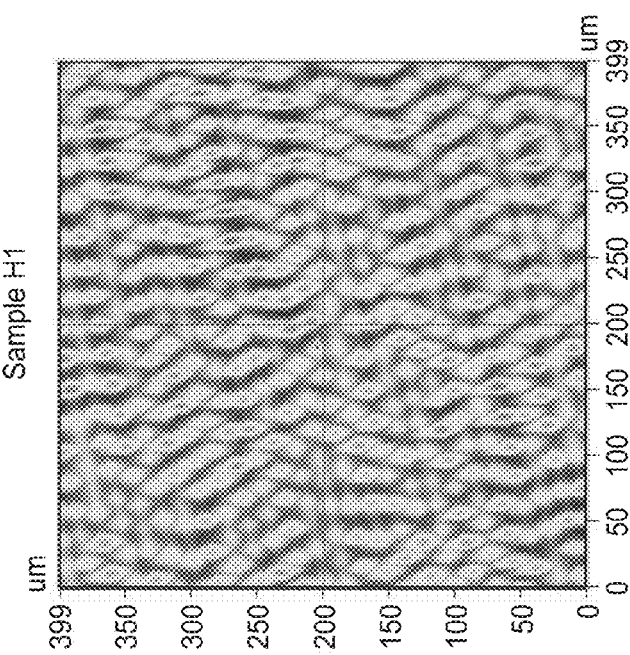
FIG. 8A is a two-dimensional surface profile of an exemplary microstructured surface (i.e. microstructured high refractive index layer H1)
Figure 8C:
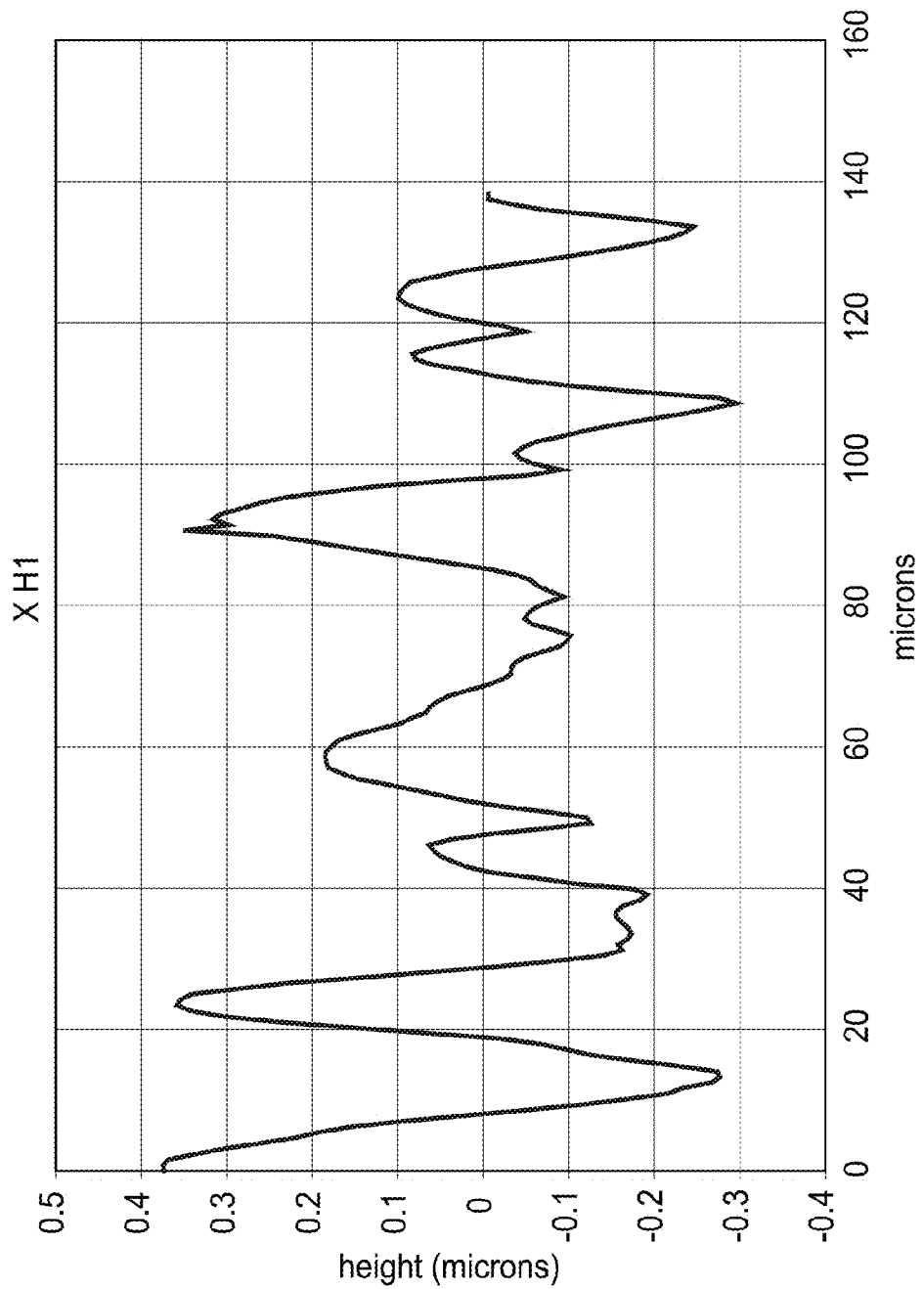
FIG. 8C-8D are cross-sectional profiles of the microstructured surface of FIG. 8A along the x- and y-directions respectively.
Figure 8D:
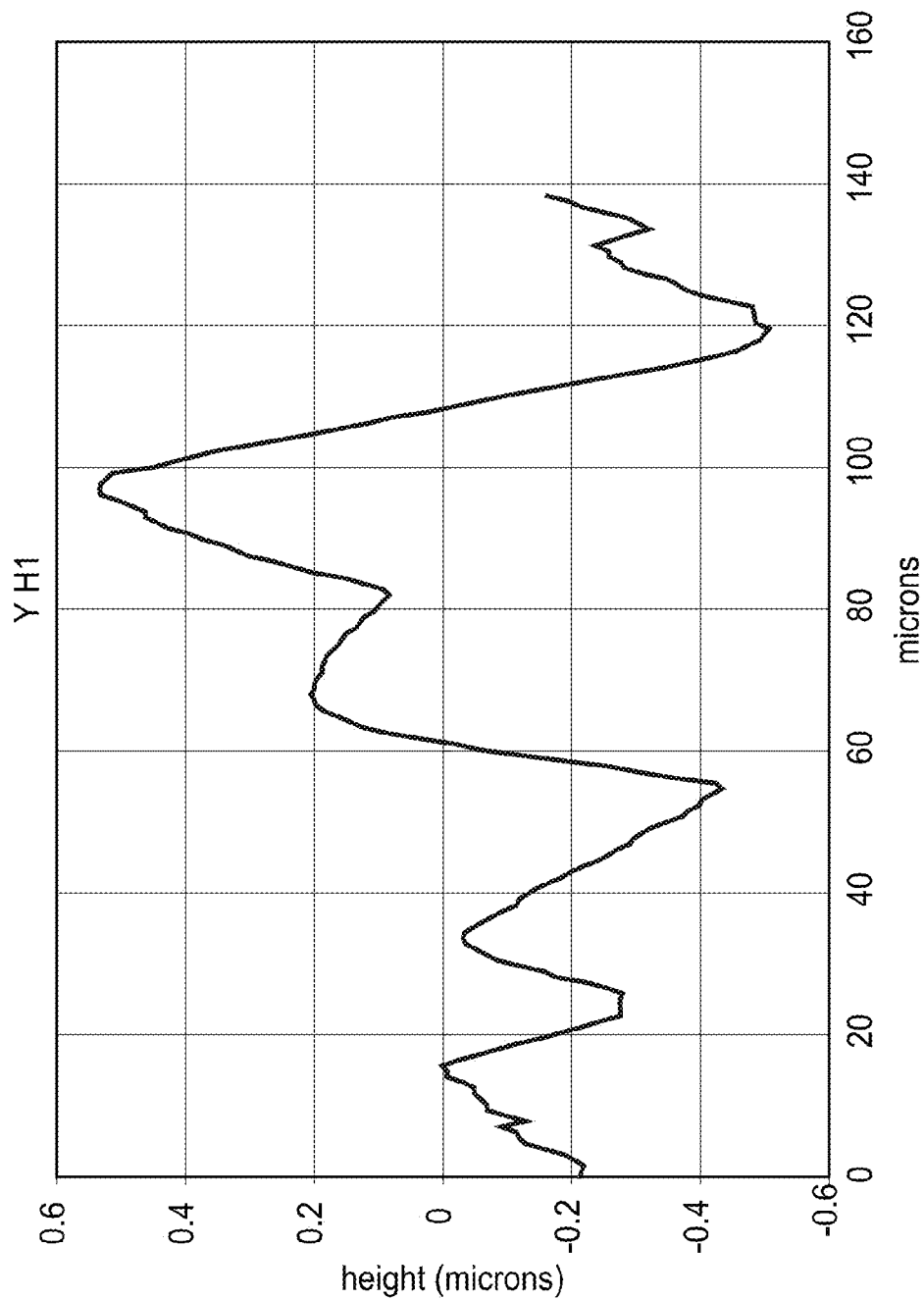
Figure 9C:
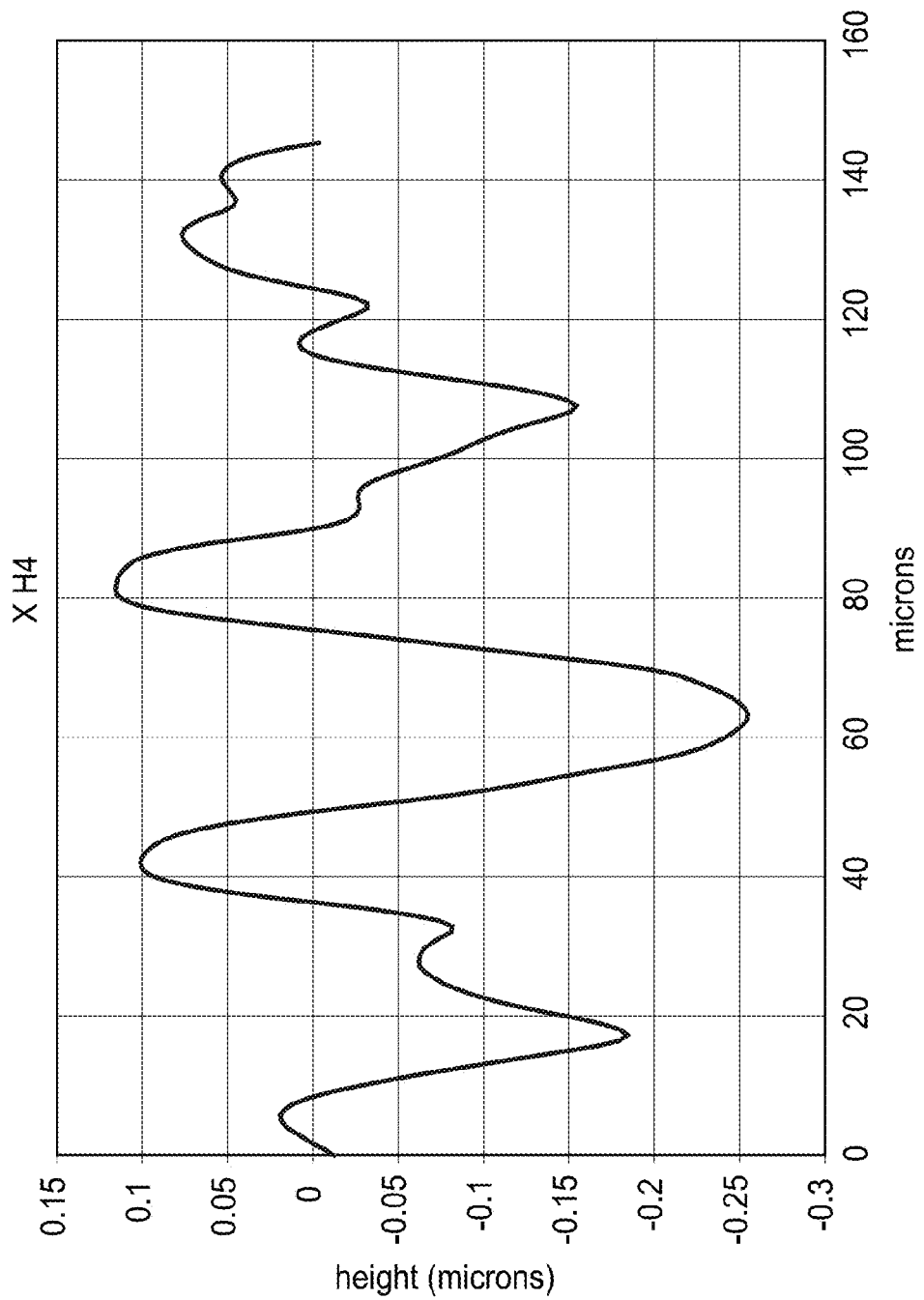
FIG. 9C-9D are cross-sectional profiles of the microstructured surface of FIG. 9A along the x- and y-directions respectively.
Figure 9D:
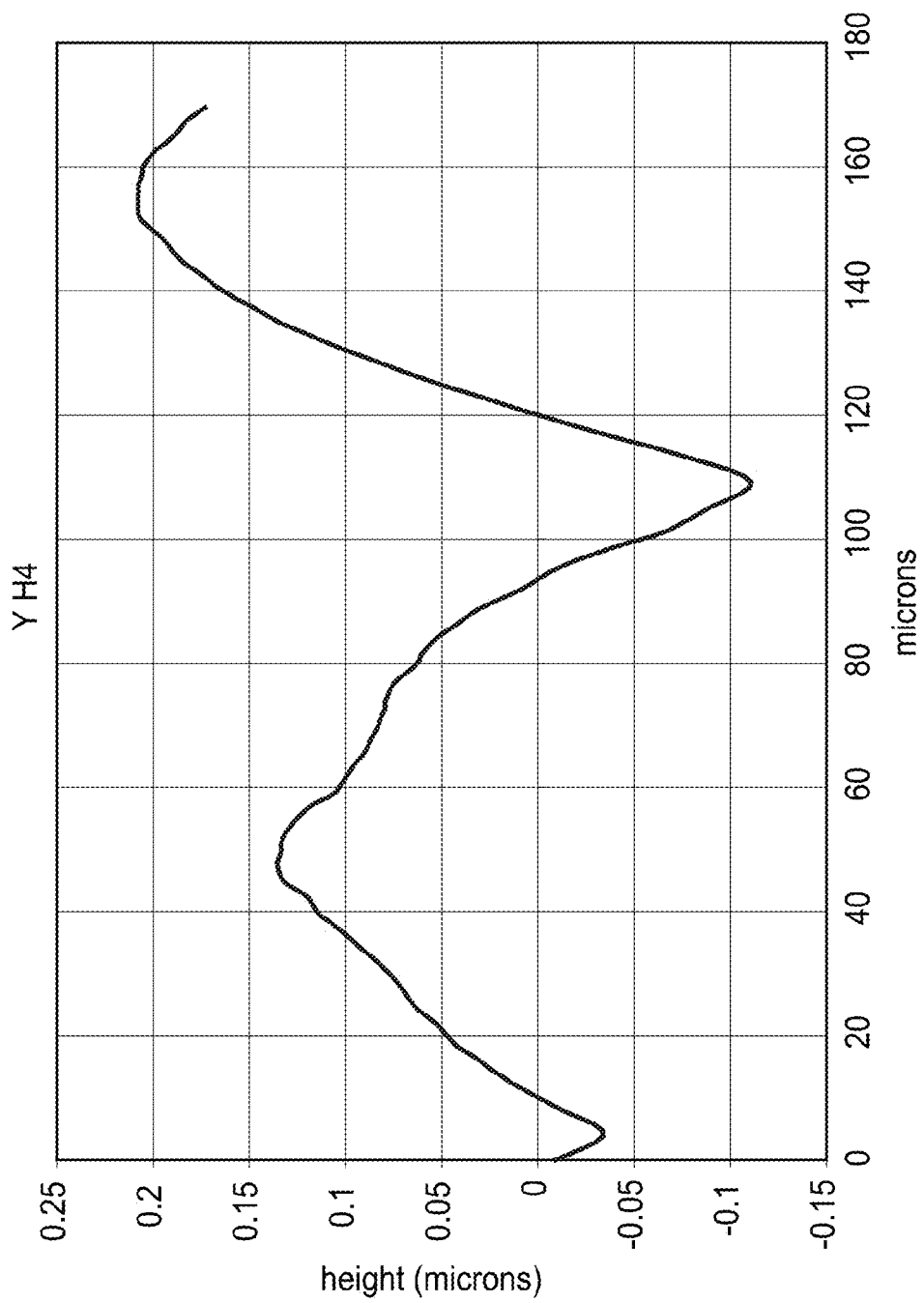
Figures 10A, 10B:
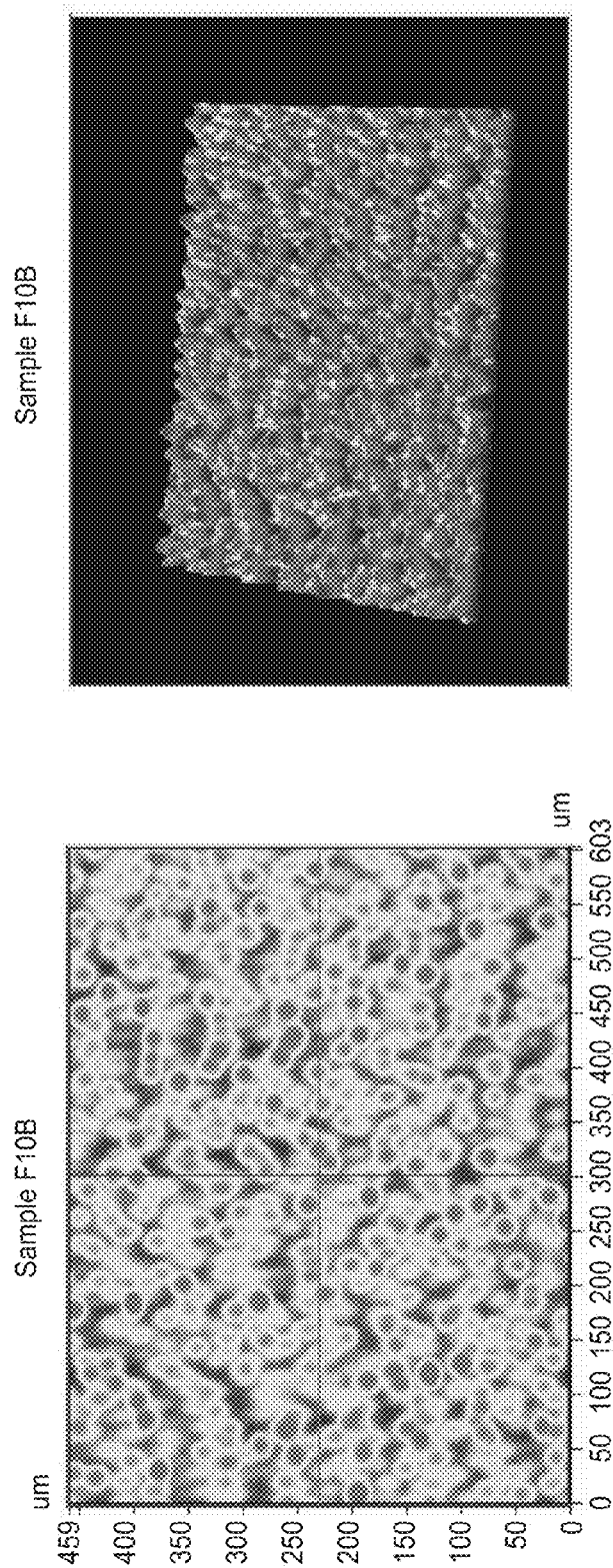
FIG. 10A is a two-dimensional surface profile of another exemplary microstructured surface (i.e. antireflective film example F10B)
FIG. 10B is a three-dimension surface profile of the exemplary microstructured surface of FIG. 10A.
Figure 10C:
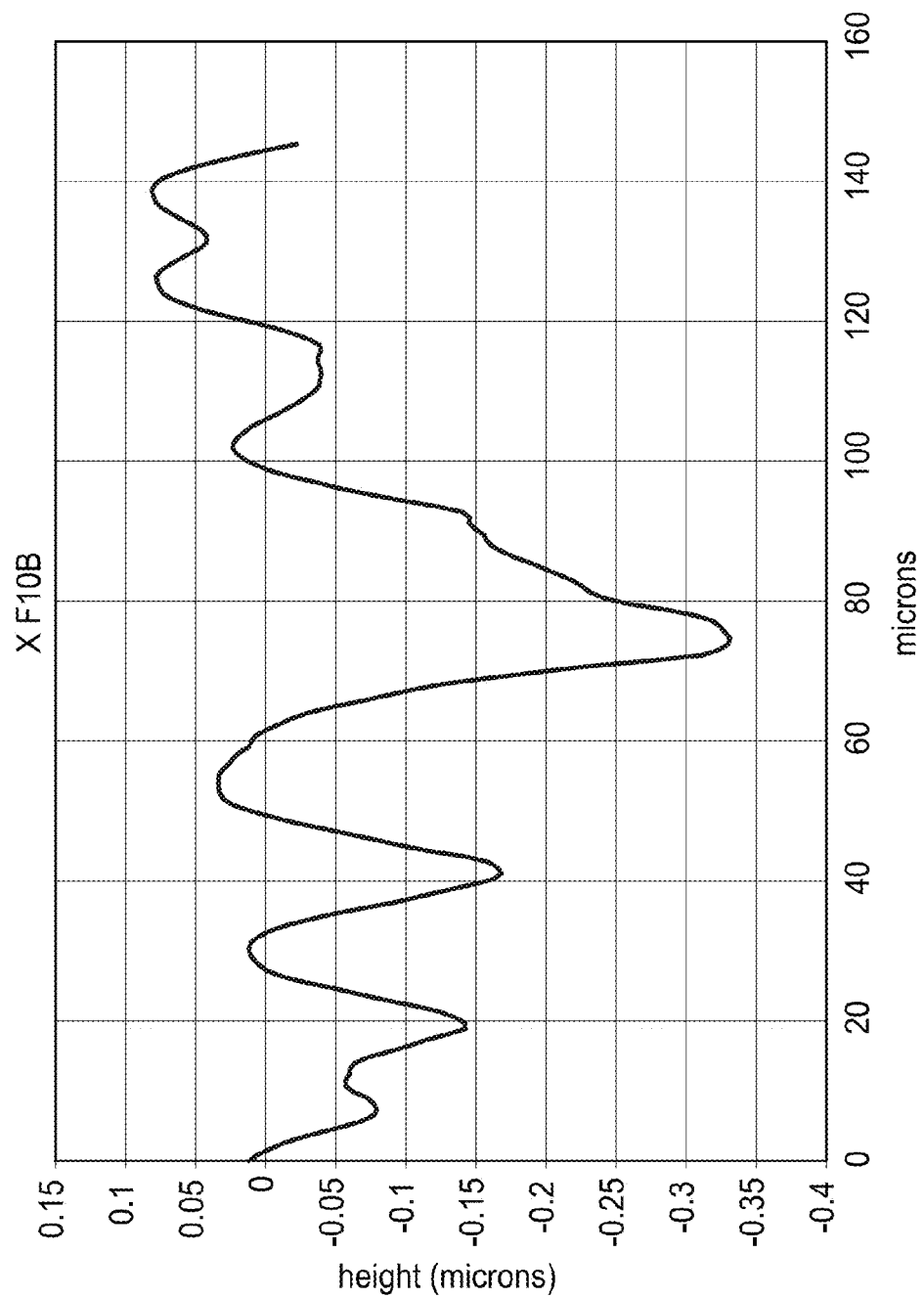
FIG. 10C-10D are cross-sectional profiles of the microstructured surface of FIG. 10A along the x- and y-directions respectively.
Figure 10D:
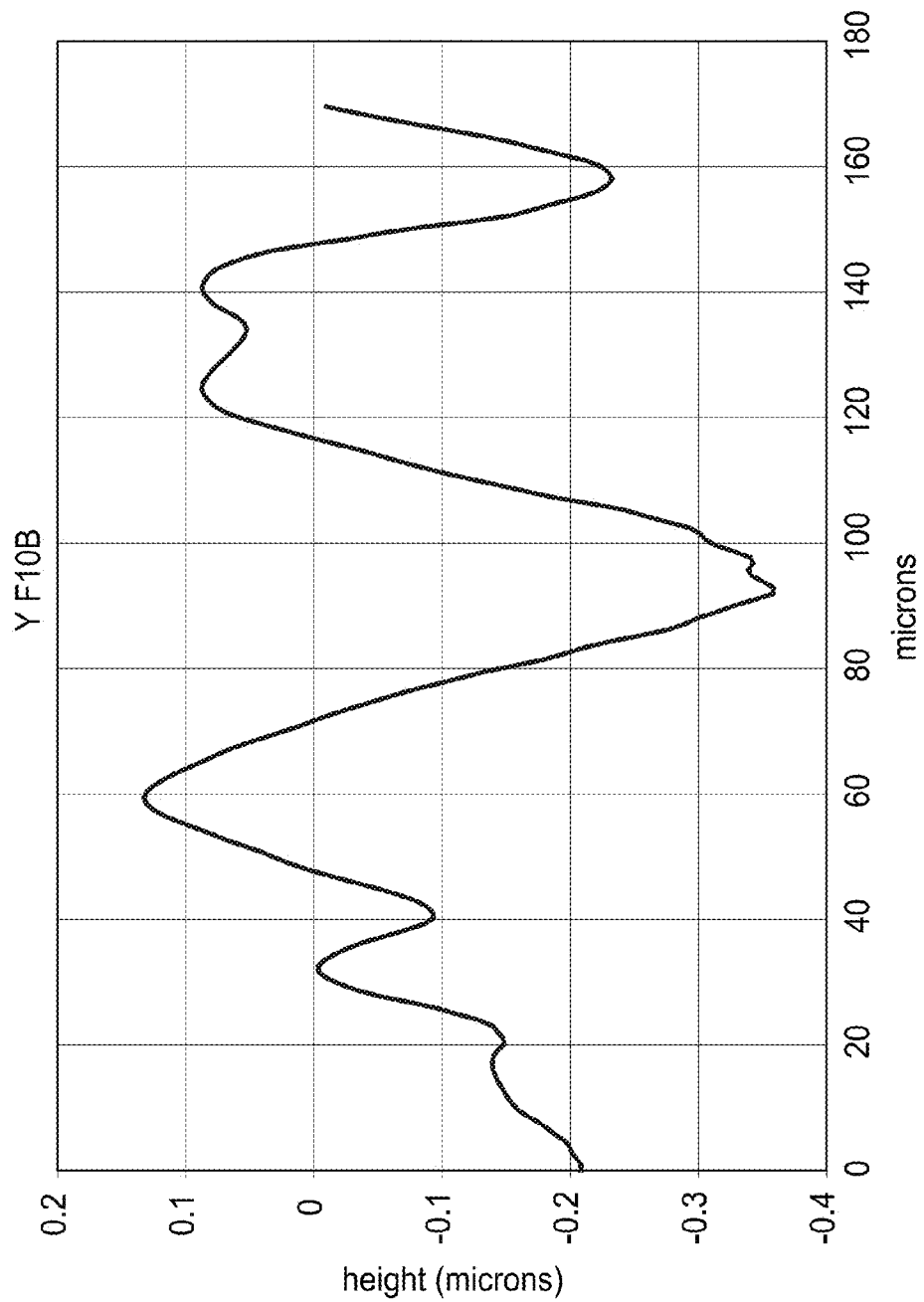

Alternatively, the microstructured surface of the tool can be formed using a cutter 1120 that has a V-shape cutting tip 1125, as depicted in FIG. 7B, a cutter 1130 that has a piece-wise linear cutting tip 1135, as depicted in FIG. 7C, or a cutter 1140 that has a curved cutting tip 1145, as depicted in 7D. In one embodiment, a V-shape cutting tip having an apex angle β of at least about 178 degrees or greater was employed.

Referring back to FIG. 6, the rotation of roll 1010 along central axis 1020 and the movement of cutter 1040 along the x-direction while cutting the roll material define a thread path around the roll that has a pitch $P_1$ along the central axis. As the cutter moves along a direction normal to the roll surface to cut the roll material, the width of the material cut by the cutter changes as the cutter moves or plunges in and out. Referring to, for example FIG. 7A, the maximum penetration depth by the cutter corresponds to a maximum width $P_2$ cut by the cutter. In general, the ratio $P_2/P_1$ is in a range from about 2 to about 4.

Several microstructured high index layers were made by microreplicating nine different patterned tools to make high refractive index matte layers. Since the microstructured surface of the high refractive index matte layer was a precise replication of the tool surface, the forthcoming description of the microstructured high refractive index layer is also a description of the inverse tool surface. Microstructured surfaces H5 and H5A utilized the same tool and thus exhibit substantially the same complement cumulative slope magnitude distribution $F_{cc}(\theta)$ and peak dimensional characteristics, as will subsequently be described. Microstructured surfaces H10A and H10B also utilized the same tool and thus also exhibit substantially the same complement cumulative slope magnitude distribution $F_{cc}(\theta)$ and peak dimensional characteristics. Microstructured surfaces H2A, H2B and H2C also utilized the same tool. Hence, H2B and H2C have substantially the same complement cumulative slope magnitude distribution and peak dimensional characteristics as H2A.

Some examples of surface profiles of illustrative microstructured high index layers are depicted in FIGS. 8A-9D. A representative microstructured antireflective film is depicted in FIGS. 10A-10D.

Representative portions of the surface of the fabricated samples, having an area ranging from about 200 microns by 250 microns to an area of about 500 microns by 600 microns, were characterized using atomic force microscopy (AFM), confocal microscopy, or phase shift interferometry according to the test method described in the examples.

The $F_{cc}(\theta)$ complement cumulative slope magnitude distribution of the slope distribution is defined by the following equation $$F_{CC}(\theta) = \frac{\sum_{q=\theta}^{\infty} N_G(q)}{\sum_{q=\theta}^{\infty} N_G(q)}.$$

$F_{cc}$ at a particular angle ($\theta$) is the fraction of the slopes that are greater than or equal to $\theta$. The $F_{cc}(\theta)$ of the microstructures of the microstructured high refractive index layer is depicted in the following Table 1.

TABLE 1

Microstructured High Refractive Index Layer Clarity, Haze & Cumulative Slope Magnitude Characterization

| | Clarity | Haze | Fcc (0.1) | Fcc (0.3) | Fcc (0.7) | Fcc (1.3) | Fcc (4.1) |
|---|---|---|---|---|---|---|---|
| Comparative Example A H11 | 87 | 5.5 | 97.5 | 90.8 | 70.9 | 43.6 | 7.5 |
| Comparative Example B H1 (FIG. 8A-8D) | 35 | 24 | 99.8 | 99.3 | 97.3 | 91.1 | 28.7 |
| H6 | 79.7 | 1.65 | 97.3 | 89.8 | 62.6 | 22.4 | 0.0 |
| H8 | 85.3 | 1.3 | 95.5 | 83.7 | 47.6 | 8.4 | 0.0 |
| H9 | 67.4 | 3 | 98.8 | 94.9 | 78.7 | 42.9 | 0.0 |
| H2A | 72.9 | 8.42 | 97.7 | 91.6 | 74.9 | 53.6 | 5.7 |
| H3 | 84.6 | 1.75 | 94.9 | 81.0 | 39.5 | 4.7 | 0.0 |

TABLE 1-continued

Microstructured High Refractive Index Layer Clarity, Haze & Cumulative Slope Magnitude Characterization

| | Clarity | Haze | Fcc (0.1) | Fcc (0.3) | Fcc (0.7) | Fcc (1.3) | Fcc (4.1) |
|---|---|---|---|---|---|---|---|
| H4 (FIG. 9A-9D) | 81 | 2.87 | 95.4 | 82.7 | 55.5 | 27.3 | 0.2 |
| H5 | 86 | 2.47 | 95.4 | 84.6 | 56.0 | 19.0 | 0.0 |
| H5A | | | 95.3 | 84.6 | 55.9 | 19.0 | 0.0 |
| H7 | 83.1 | 1.21 | 95.9 | 83.5 | 49.1 | 9.3 | 0.0 |
| H10A | 76.2 | 8.45 | 97.9 | 92.1 | 72.6 | 37.7 | 0.1 |
| H10B (FIG. 10A-10D) | 74.9 | 7.17 | 97.9 | 92.1 | 73.1 | 38.6 | 0.0 |
| H2B | 72 | 8.52 | Same as H2 | | | | |
| H2C | 71.3 | 8.66 | Same as H2. | | | | |

*H11 is a commercially available matte AR film comprising $SiO_2$ particles.

The optical clarity values disclosed herein were measured using a Haze-Gard Plus haze meter from BYK-Gardiner. As depicted in Table 1, the optical clarity of the polymerized high refractive index hardcoat microstructured surface is generally at least about 60% or 65%. In some embodiments, the optical clarity is at least 75% or 80%. In some embodiments, the clarity is no greater than 90%, or 89%, or 88%, or 87%, or 86%, or 85%. The microstructured antireflective film also had such optical clarity, as illustrated by forthcoming Table 4.

Optical haze is typically defined as the ratio of the transmitted light that deviates from the normal direction by more than 2.5 degrees to the total transmitted light. The optical haze values disclosed herein were also measured using a Haze-Gard Plus haze meter (available from BYK-Gardiner, Silver Springs, Md.) according to the procedure described in ASTM D1003. As depicted in Table 1 above, the optical haze of the polymerized high refractive index hardcoat microstructured surface was less than 20% and preferably less than 15%. In favored embodiments, the optical haze ranges from about 1%, or 2%, or 3% to about 10%. In some embodiments the optical haze ranges from about 1%, or 2% or 3% to about 5%. As illustrated by forthcoming Table 4, the microstructured antireflective film also had such haze.

The microstructured surface comprises a plurality of peaks, as characterized according to the test method described in the forthcoming examples. Dimensional characteristics of the peaks are reported in the following Table 2:

TABLE 2

Microstructured High Refractive Index Layer Peak Dimensional Characterization

| | ECD mean microns | Length mean microns | Width mean microns | W/L mean | NN microns | Sparkle |
|---|---|---|---|---|---|---|
| Comparative H11 | 3.37 | 4.10 | 3.05 | 0.82 | 13.24 | 2 |
| Comparative H1 | 12.35 | 18.94 | 9.23 | 0.55 | 18.90 | 1 |
| H5 | 11.29 | 14.52 | 9.53 | 0.67 | 17.25 | 1 |
| H4 | 23.46 | 50.70 | 12.15 | 0.28 | 33.44 | 2 |
| H10A | 15.31 | 20.72 | 12.42 | 0.61 | 22.60 | 2 |
| H10B | 14.7 | 19.776 | 11.986 | 0.619 | 21.34 | 2 |
| H6 | 21.82 | 28.66 | 18.18 | 0.64 | 29.36 | 3 |
| H8 | 24.38 | 31.63 | 20.74 | 0.67 | 34.37 | 3 |
| H9 | 21.55 | 29.47 | 17.43 | 0.60 | 29.11 | 3 |
| H3 | 58.23 | 74.94 | 48.69 | 0.66 | 76.34 | 4 |
| H7 | 30.55 | 41.44 | 24.82 | 0.61 | 40.37 | 4 |
| H2A | | | Not determined. | | | |

Such dimensional characteristics have been found to relate to "sparkle", which is a visual degradation of an image displayed through a matte surface due to interaction of the matte surface with the pixels of an LCD. The appearance of sparkle can be described as a plurality of bright spots of a specific color that superimposes "graininess" on an LCD image detracting from the clarity of the transmitted image. The level, or amount, of sparkle depends on the relative size difference between the microreplicated structures and the pixels of the LCD (i.e. the amount of sparkle is display dependent). In general, the microreplicated structures need to be much smaller than LCD pixel size to eliminate sparkle. The amount of sparkle is evaluated by visual comparison with a set of physical acceptance standards (samples with different levels of sparkle) on a LCD display available under the trade designation "Apple iPod Touch" (having a pixel pitch of about 159 μm as measured with a microscope) in the white state. The scale ranges from 1 to 4, with 1 being the lowest amount of sparkle and 4 being the highest.

Although Comparative H1 had low sparkle, such microstructured high refractive index layer had low clarity and high haze as reported in Table 1.

some embodiments, the NN ranges from 15 microns to about 20 microns, or 25 microns. Except for the embodiment wherein W/L is less than 0.5 the higher sparkle embodiments typically have a NN of at least about 30 or 40 microns.

A low index layer was applied to the microstructured high index layers of Table 2. Reflection (i.e. first surface specular reflection) of the microstructured antireflective films was measured using a Shimadzu UV-3101PC UN-VIS-NIR Scanning Spectrophotometer with the machine extension, MPC 3100, available from Shimadzu Co., Japan and Shimadzu Scientific Instruments, Columbia, Md. or at an incident angle of 12° in reflection mode from 380 to 800 nm or a UltaScan XE available from Hunter Labs measuring RSIN and RSEX modes wherein the specular reflection=(RSIN Y–RSEX Y). These instruments measure the reflection of an area of about 1 cm$^2$. The reflection curve was plotted and the wavelength that the reflection was a minimum was recorded.

The clarity, haze, and complement cumulative slope magnitude distribution of the microstructured surfaces having a sparkle no greater than "3" were remeasured, as reported in the following table.

TABLE 3

Microstructured Antireflective Film Surface Characterization

|  | HIHC | Lambda | Rphot | Clarity | Haze | Fcc (0.1) | Fcc (0.3) | Fcc (0.7) | Fcc (1.3) | Fcc (4.1) |
|---|---|---|---|---|---|---|---|---|---|---|
| Comparative F11 | H11 | 555 | 1.11 | 82.4 | 4.9 | 94.9 | 82.6 | 54.1 | 27.2 | 3.4 |
| Comparative F1 | H1 | 487 | 1.51 | 37.7 | 19.5 | 99.7 | 99.0 | 95.8 | 86.6 | 22.2 |
| F6 | H6 | 536 | 1.42 | 82.1 | 3.30 | 96.0 | 84.7 | 49.8 | 11.1 | 0.0 |
| F8 | H8 | 548 | 1.32 | 87.0 | 1.72 | 96.4 | 83.6 | 44.4 | 6.7 | 0.0 |
| F9 | H9 | 559 | 1.67 | 71.2 | 5.04 | 98.0 | 92.0 | 68.9 | 30.8 | 0.0 |
| F2A1 | H2 | 558 | 2.48 | 80 | 5.4 | 95.3 | 84.2 | 60.4 | 32.9 | 0.6 |
| F2A2 | H2 | 530 | 1.93 | 78.7 | 5.5 | 98.0 | 92.4 | 75.2 | 48.2 | 7.5 |
| F2B | H2B | 644 | 1.33 | 74.0 | 8.94 | Not measured. | | | | |
| F2C | H2C | 473 | 1.40 | 72.9 | 7.84 | Not measured. | | | | |
| F4 | H4 | 614 | 1.57 | 82 | 3.37 | 93.9 | 78.7 | 46.7 | 18.1 | 0.1 |
| F5 | H5 | 547 | 1.35 | 87.6 | 4.93 | 94.9 | 81.3 | 44.2 | 8.4 | 0.0 |
| F10A | H10A | 518 | 1.57 | 79.3 | 4.07 | 97.3 | 89.7 | 65.2 | 26.0 | 0.0 |
| F10B | H10B | 573 | 1.26 | 77.8 | 3.28 | 96.4 | 88.1 | 63.8 | 26.1 | 0.0 |

Comparative H11 is a commercially available matte film wherein substantially all the peaks are formed by matte particles. Hence, the mean equivalent circular diameter (ECD), mean length, and mean width are approximately the same. The other examples (i.e. except for H1) demonstrate that a combination of low antireflection and low sparkle can be obtained with an antireflective film having substantially different peak dimensional characteristics than Comparative H11. For example, the peaks of all the other exemplified microstructured surfaces had a mean ECD of at least 5 microns and typically of at least 10 microns, substantially higher than Comparative H11. Further, the other examples having lower sparkle than H3 and H7 had a mean ECD (i.e. peak) of less than 30 microns or less than 25 microns. The peaks of the other exemplified microstructured surfaces had a mean length of greater than 5 microns (i.e. greater than H11) and typically greater than 10 microns. The mean width of the peaks of the exemplified microstructured surfaces is also at least 5 microns. The peaks of the low sparkle examples had a mean length of no greater than 15 microns, and in some embodiments no greater than 10 microns. The ratio of width to length (i.e. W/L) is typically at least 1.0, or 0.9, or 0.8. In some embodiments, the W/L is at least 0.6. In another embodiment, the W/L is less than 0.5 or 0.4 and is typically at least 0.1 or 0.15. The nearest neighbor (i.e. NN) is typically at least 10 or 15 microns and no greater than 100 microns. In The antireflective films exhibited an average photopic reflectance (i.e. Rphot) of less than 2%, or less than 1.5% at 550 nm as measured with a spectrophotometer as just described.

Each value reported in the slope magnitude columns is the total percentage of microstructures (i.e. the total percentage of the microstructured surface) having such slope magnitude or greater. For example, in the case of microstructured surface H6, 97.3% of the microstructures had a slope magnitude of 0.1 degree or greater; 89.8% of the microstructures had a slope of 0.3 degrees or greater; 62.6% of the microstructures had a slope magnitude of 0.7 degrees or greater; 22.4% of the microstructures had a slope magnitude of 1.3 degrees greater; and 0 (none) of the microstructures (of the area measured) had a slope magnitude of 4.1 degrees or greater. Conversely, since 62.6% of the microstructures had a slope magnitude of 0.7 degrees or greater, 100%−62.6%=37.4% had slope magnitude less than 0.7 degrees. Further, since 22.4% of the microstructures had a slope magnitude of 1.3 degrees greater, 100%−22.4%=77.6% of the microstructures had a slope magnitude less than 1.3 degrees.

Figure 11:
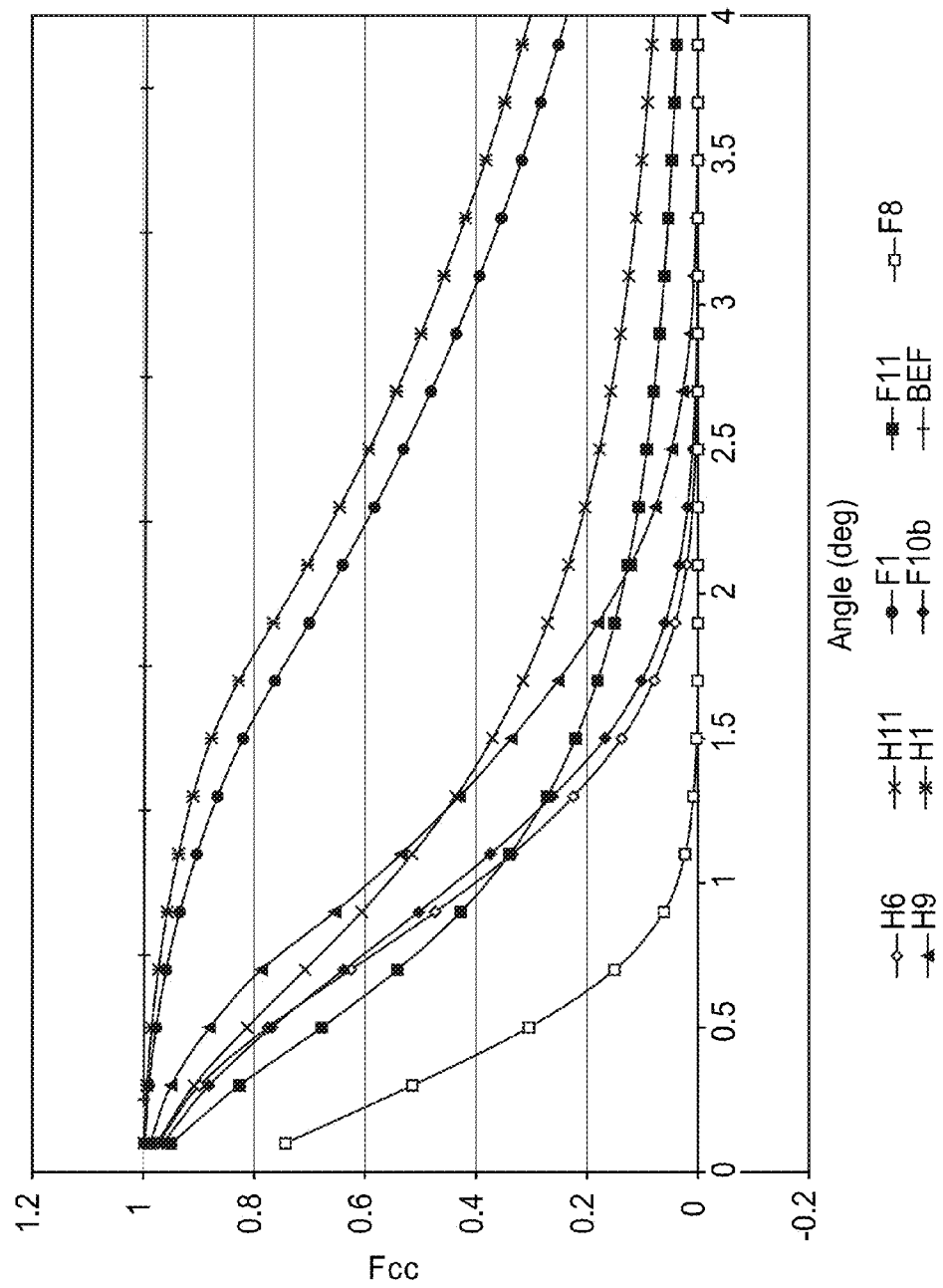
FIG. 11 is a graph depicting the complement cumulative slope magnitude distribution for various exemplified microstructured surfaces.

As indicated in Tables 1 and 3 as well as FIG. 11, at least 90% or greater of the microstructures of each of the microstructured surfaces had a slope magnitude of at least 0.1 degrees or greater. Further, at least 75% of the microstructures had a slope magnitude of at least 0.3 degrees.

The preferred high refractive index hardcoat and AR microstructured surface, having high clarity and low haze, had different cumulative slope characteristics than H1 and F1. In the case of F1 at least 95.8% of the microstructures had a slope magnitude of at least 0.7 degrees. Thus only 4.2% had a slope magnitude less than 0.7 degrees. For the other microstructured surfaces, at least 30% or 35% or 40% and in some embodiments at least 45% or 50% or 55%, or 60% or 65% or 70% or 75% of the microstructures had a slope magnitude of at least 0.7 degrees. Thus, at least 25%, 30%, 35%, 40%, 45%, 50%, 55%, 60%, 65% or 70% had a slope magnitude less than 0.7 degrees.

Alternatively or in addition thereto, the preferred antireflective microstructured surfaces can be distinguished from F1, in that for F1 at least 86.6% of the microstructures had a slope magnitude of at least 1.3 degrees. Thus only 13.4% had a slope magnitude less than 1.3 degrees. For the other microstructured surfaces, at least 25% of the microstructures had a slope magnitude of less than 1.3 degrees. In one embodiment, at least 30%, or 35%, or 40%, or 45% of the microstructures had a slope magnitude of at least 1.3 degrees. Hence, 55% or 60% or 65% or 70% of the microstructures had a slope magnitude less than 1.3 degrees. In other embodiments, at least 5% or 10% or 15% or 20% of the microstructures had a slope magnitude of at least 1.3 degrees. Hence, 80% or 85% or 90% or 95% of the microstructures had a slope magnitude less than 1.3 degrees.

Alternatively or in addition thereto, the antireflective microstructured surface can be distinguished from F1, in that for F1 at least about 22.2% of the microstructures had a slope magnitude of at least 4.1 degrees; whereas in the case of the favored microstructured surface, less than 20% or 15% or 10% of the microstructures had a slope magnitude of 4.1 degrees or greater. Thus, 80% or 85% or 90% had a slope magnitude less than 4.1 degrees. In one embodiment, 5 to 10% of the microstructures had a slope magnitude of 4.1 degrees or greater. In most embodiments, less than 5% or 4% or 3% or 2% or 1% of the microstructures had a slope magnitude of 4.1 degrees or greater.

The application of the low index layer to the microstructured high refractive index layer may reduce the clarity up to about 10%, provided the clarity of the antireflective film is within the target ranges, as previously described. In some embodiments, the difference in clarity between the microstructured high refractive index layer and the antireflective film is no greater than about 3%, or 2% or 1%. Further, the application of the low index layer to the microstructured high refractive index layer may increase the haze up to 5%. In some embodiments, the difference in haze between the microstructured high refractive index layer and the antireflective film is no greater than about 3%, or 2% or 1%.

The application of the low index layer to the microstructured high refractive index layer typically changes the complement cumulative slope magnitude distribution of the microstructured surface. With reference to FIG. 11, the complement cumulative slope magnitude distribution of the microstructured antireflective film, further comprises a low refractive index layer tended to be slightly lower, yet generally has a similar complement cumulative slope magnitude distribution curve as the corresponding microstructured high refractive index layer. Although, the complement cumulative slope magnitude distribution of the microstructured low refractive index layer is lower, the complement cumulative slope magnitude distribution and peak dimensional features are within the same target ranges as previously described with respect to the microstructured high refractive index layer. In some embodiments, the percentage of microstructures having a slope magnitude of at least 0.7 degrees or of at least 1.3 degrees changes (i.e. absolute value of H1–F1) by less than 5%, 4%, 3%, 2%, or 1%.

The other embodiments, the percentage of microstructures having a slope of 0.7 degrees or greater as well as the percentage of microstructures having a slope magnitude of at least 1.3 degrees may increase by up to 10%. It is surmised that the high refractive index microstructured layer may be fabricated have higher slope magnitudes than the desired ranges described above, the slope magnitude being reduced upon application of the low refractive index layer.

The application of the low index layer to the microstructured high refractive index layer typically slightly changes the dimensions of the peak microstructures. For example, the mean equivalent circular diameter (ECD) and/or mean length, and/or mean width typically changes by less than 1.5 or 1 micron. In some embodiments, the change in mean ECD is no greater than 0.5, 0.4, 0.3, or 0.2 microns. The mean W/L typically change by no greater than 0.5. The distance between nearest peak microstructures (i.e. nearest neighbor may change by 0.5 microns, but typically by no more than 2.5 or 3 microns.

With regard to the exemplified high refractive index microstructured layers and AR film, the microstructures cover substantially the entire surface. However, without intending to be bound by theory it is believed that the microstructures having slope magnitudes of at least 0.7 degrees provide the desired matte properties. Hence, it is surmised that the microstructures having a slope magnitudes of at least 0.7 degrees may cover at least about 40%, or at least about 45%, or at least about 50%, or at least about 55%, or at least about 60%, or at least about 65%, or at least about 70%, of the major surface, yet still provide the desired high clarity, low haze, and sufficient antireflection properties.

The plurality of peaks of the microstructured surface can also be characterized with respect to mean height, average roughness (Ra), and average maximum surface height (Rz).

TABLE 4

Mean Height and Roughness

|  | Mean Height (microns) | Ra (microns) | Rz (microns) |
|---|---|---|---|
| Comparative F11 | 0.357 | 0.148 | 2.462 |
| Comparative F1 | 0.678 | 0.168 | 1.297 |
| F6 | 0.441 | 0.101 | 0.785 |
| F8 | 0.387 | 0.085 | 0.727 |
| F9 | 0.549 | 0.137 | 1.067 |
| F2A1 | 0.290 | Not measured. | |
| F2A2 | 0.352 | Not measured. | |
| F4 | 0.371 | 0.081 | 0.687 |
| F5 | 0.257 | 0.058 | 0.503 |
| F7 (Sparkle of 4) | 0.375 | 0.097 | 0.727 |
| F10A | 0.381 | 0.089 | 0.714 |
| F10B | 0.660 | 0.090 | 0.790 |

The average surface roughness (i.e. Ra) is typically less than 0.20 microns. The favored embodiments having high clarity in combination with sufficient haze exhibit a Ra of less no greater than 0.15 microns. In some embodiments, the Ra is less than 0.14, or 0.13, or 0.12, or 0.11, or 0.10 microns. The Ra is typically at least 0.04 or 0.05 microns.

The average maximum surface height (i.e. Rz) is typically less than 3 microns or less than 2.5 microns. The favored embodiments having high clarity in combination with sufficient haze exhibit an Rz of less no greater than 1.20 microns.

In some embodiments, the Rz is less than 1.10, or 1.00 micron. The Rz is typically at least 0.40 or 0.50 microns.

The high refractive index layer of the matte or antireflective film typically comprises a polymeric material such as the reaction product of a polymerizable resin having a refractive index of at least 1.60. The polymerizable resin preferably comprises surface modified nanoparticles (preferably having a high refractive index of at least 1.60). A variety of (e.g. non-fluorinated) free-radically polymerizable monomers, oligomers, polymers, and mixtures thereof can be employed in the organic material of the high refractive index layer.

Various high refractive index particles are known including for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. No. 7,241,437 and U.S. Pat. No. 6,376,590.

The low refractive index surface layer comprises the reaction product of a polymerizable low refractive index composition. Such low refractive index composition preferably comprises one or more fluorinated free-radically polymerizable material and surface modified inorganic nanoparticles. The surface modified particles preferably having a low refractive index (e.g. less than 1.50) dispersed in a free-radically polymerized fluorinated organic material described herein. Various low refractive index inorganic particles are known such as metal oxides, metal nitrides, and metal halides (e.g. fluorides). Low refractive index particles include colloidal silica, magnesium fluoride, and lithium fluoride. Silicas for use in the low refractive index composition are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers -130, -150, and -200. Fumed silicas are also commercially available from Cabot Corp., Tuscola, Ill., under the trade designations CAB-O-SPERSE 2095", "CAB-O-SPERSE A105", and "CAB-O-SIL M5".

The concentration of (e.g. inorganic) nanoparticles in the low refractive index layer and/or the high refractive index layer is typically at least 25 wt-% or 30 wt-%. The low refractive index layer typically comprises no greater than 50 wt-% or 40 wt-% inorganic oxide nanoparticles. The concentration of inorganic nanoparticles in the high refractive index layer is typically at least 40 wt-% and no greater than about 60 wt-% or 70 wt-%.

The inorganic nanoparticles are preferably treated with a surface treatment agent. Silanes are preferred for silica and other for siliceous fillers. Silanes and carboxylic acids are preferred for metal oxides such as zirconia. Various surface treatments are known, some of which are described in US2007/0286994.

The high refractive index (e.g. zirconia) nanoparticles may be surface treated with a surface treatment comprising a compound comprising a carboxylic acid end group and a $C_3$-$C_8$ ester repeat unit or at least one $C_6$-$C_{16}$ ester unit, as described in PCT Publication Number WO 2010/074862; incorporated herein by reference.

The compound typically has the general formula:

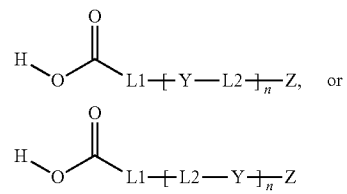

wherein
n averages from 1.1 to 6;
L1 is a $C_1$-$C_8$ alkyl, arylalkyl, or aryl group, optionally substituted with one or more oxygen atoms or an ester group;
L2 is a $C_3$-$C_8$ alkyl, arylalkyl, or aryl group, optionally substituted with one or more oxygen atoms;
Y is

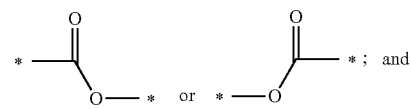

Z is an end group comprising a $C_2$-$C_8$ alkyl, ether, ester, alkoxy, (meth)acrylate, or a combination thereof.

In some embodiments, L2 comprises a C6-C8 alkyl group and n averages 1.5 to 2.5. Z preferably comprises a $C_2$-$C_8$ alkyl group. Z preferably comprises a (meth)acrylate end group.

Surface modifiers comprising a carboxylic acid end group and a $C_3$-$C_8$ ester repeat unit can be derived from reacting a hydroxy polycaprolactone such as a hydroxy polycaprolactone (meth)acrylate with an aliphatic or aromatic anhydride. The hydroxy polycaprolactone compounds are typically available as a polymerized mixture having a distribution of molecules. At least a portion of the molecules have a $C_3$-$C_8$ ester repeat unit, i.e. n is at least 2. However, since the mixture also comprises molecules wherein n is 1, the average n for the hydroxy polycaprolactone compound mixture may be 1.1, 1.2, 1.3, 1.4, or 1.5. In some embodiments, n averages 2.0, 2.1, 2.2, 2.3, 2.4 or 2.5.

Suitable hydroxy polycaprolactone (meth)acrylate compounds are commercially available from Cognis under the trade designation "Pemcure 12A" and from Sartomer under the trade designation "SR495" (reported to have a molecular weight of 344 g/mole).

Suitable aliphatic anhydrides include for example maleic anhydride, succinic anhydride, suberic anhydride, and glutaric anhydride. In some embodiments, the aliphatic anhydride is preferably succinic anhydride.

Aromatic anhydrides have a relatively higher refractive index (e.g. RI of at least 1.50). The inclusion of surface treatment compounds such as those derived from aromatic anhydrides can raise the refractive index of the overall polymerizable resin composition. Suitable aromatic anhydrides include for example phthalic anhydride.

Alternatively, or in addition thereto, the surface treatment may comprise a (meth)acrylate functionalized compound prepared by the reaction of an aliphatic or aromatic anhydride as previously described and a hydroxyl (e.g. $C_2$-$C_8$) alkyl (meth)acrylate.

Examples of surface modification agents of this type are succinic acid mono-(2-acryloyloxy-ethyl) ester, maleic acid mono-(2-acryloyloxy-ethyl) ester, and glutaric acid mono-(2-acryloyloxy-ethyl) ester, maleic acid mono-(4-acryloyloxy-butyl) ester, succinic acid mono-(4-acryloyloxy-butyl) ester, and glutaric acid mono-(4-acryloyloxy-butyl) ester. These species are shown in WO2008/121465; incorporated herein by reference.

In one embodiment, the low refractive index composition comprises a free-radically polymerizable fluoropolymer.

One class of fluoropolymers are formed from the constituent monomers known as tetrafluoroethylene ("TFE"), hexafluoropropylene ("HFP"), and vinylidene fluoride ("VDF," "VF2,"). The fluoropolymers preferably comprise at least two of the constituent monomers (HFP and VDF), and more preferably all three of the constituents monomers in varying molar amounts. The fluoropolymer comprises free-radically polymerizable groups. This can be accomplished by the inclusion of halogen-containing cure site monomers ("CSM") and/or halogenated endgroups. Alternatively or in addition thereto, the fluoropolymer can be rendered reactive by dehydrofluorination by any method that will provide sufficient (0.5 to 6 mole percent) carbon-carbon unsaturations of the fluoropolymer.

Halogen cure sites can be introduced into the polymer microstructure via the use of halogenated chain transfer agents which produce fluoropolymer chain ends that contain reactive halogen endgroups. Such chain transfer agents ("CTA") are well known in the literature and typical examples are: Br—$CF_2CF_2$—Br, $CF_2Br_2$, $CF_2I_2$, $CH_2I_2$. Other typical examples are found in U.S. Pat. No. 4,000,356 to Weisgerber. An advantage to use of cure site monomers in forming the co-crosslinked network, as opposed to a dehydrofluorination approach, is that the optical clarity of the formed polymer layer is not compromised since the reaction of the acrylate and the fluoropolymer does not rely on unsaturation in the polymer backbone in order to react.

Another class of fluororopolymers comprises polymeric species having a hyperbranched structure; as described in U.S. Pat. No. 7,615,283; incorporated herein by reference.

The polymer comprises the reaction product of i) at least one multi-functional free-radically polymerizable material having a fluorine content of at least 25 wt-%, and ii) optionally at least one multi-functional free-radically polymerizable material having a fluorine content ranging from 0 to less than 25 wt-%, wherein the total amount of multi-functional materials is at least about 25 wt-% based on wt-% solids of the polymerizable organic composition.

The fluoro(meth)acrylate polymer intermediate solution is surmised to comprise a mixture of unreacted free-radically polymerizable starting materials, oligomeric species, and polymeric species having a hyperbranched structure. A hyperbranched polymer is defined as any polymer in which the structural repeat unit has a connectivity of more than two; this definition may be extended to hypercrosslinked polymers (in which macrocycles are present, but not to ladder and spiro polymers).

A two-step process is employed to prepare the low refractive index composition. A first (e.g. solution) polymerization reaction utilizes dilute organic solvent conditions to form a hyperbranched fluoroacrylate polymer (e.g. a nanogel). The hyberbranched fluoroacrylate is then utilized as a reactant in a second (e.g. photo) polymerization reaction under substantially 100% solids conditions to form the fluorinated crosslinked system that is surmised an interpenetrating network of the (nanogel) polymer in a crosslinked (meth)acrylate host.

Various fluorinated mono- and multi-functional free-radically polymerizable monomers, oligomers, and polymers may be employed in the preparation of the low refractive index layer. Such materials generally comprises free-radically polymerizable moieties in combination with (per)fluoropolyether moieties, (per)fluoroalkyl moieties, and (per)fluoroalkylene moieties. Within each of these classes are multi-functional species having a high fluorine content, (e.g. of at least 25 wt-%) that can be employed as i). Other species within each class, having fluorine content less than 25 wt-%, can be employed as auxillary components. In some embodiments, such auxiliary fluorinated (meth)acrylate monomers can aid in compatibilizing the low refractive index or other fluorinated materials present in the reaction mixture.

The low refractive index layer and fluoro(meth)acrylate polymer may be prepared from a variety of (per)fluoropolyether (meth)acrylate compounds. One suitable high fluorine containing material is a (e.g. perfluoropolyether)acrylate oligomer reported by the supplier to have a refractive index of 1.341 commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole and consists primarily of a perfluorinated polyether of the general formula:

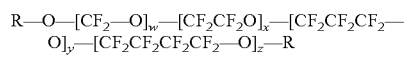

wherein the —$[CF_2—O]_w$— and —$[CF_2CF_2O]_x$— repeat units are the primary repeat units of the backbone in the perfluorinated polyether chain, and the R— end groups are primarily of $H_2C=CH—CO—O—(CH_2CH_2—O)_x—CH_2CF_2$—.

The fluoropolymer containing low refractive index composition described herein preferably comprise at least one amino organosilane ester coupling agent or a condensation product thereof as described in U.S. Pat. No. 7,323,514. Suitable amino organosilane ester coupling agent include 3-aminopropyltrimethoxysilane, 3-aminopropyltriethoxysilane, (aminoethylaminomethyl)phenethyltrimethoxysilane, (aminoethylaminomethyl)phenethyltriethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 4-aminobutyltrimethoxysilane, 4-aminobutyltriethoxysilane, 3-aminopropylmethyldiethoxysilane, 3-aminopropylmethyldimethoxysilane, 3-aminopropyldimethylmethoxysilane, 3-aminopropyldimethylethoxysilane, 2,2-dimethoxy-1-aza-2-silacyclopentane-1-ethanamine, 2,2-diethoxy-1-aza-2-silacyclopentane-1-ethanamine, 2,2-diethoxy-1-aza-2-silacyclopentane, 2,2-dimethoxy-1-aza-2-silacyclopentane, 4-aminophenyltrimethoxy silane, and 3-phenylaminopropyltrimethoxy silane. One suitable amino organosilane ester coupling agent is commercially available under the trade designation "A1106".

Without wishing to be bound by theory, it is surmised that the amino organosilane ester coupling agent increases the viscosity of the low index coating composition, thereby resisting the flow. When the low index coating composition flows from the peaks of the microstructured high index into the valley or land layer between peaks, an increase is reflection can arise. Fumed silica may similarly increase the viscosity of the low index composition. Higher molecular weight resins and lower boiling point solvent can also increase the resistance of the low index coating composition to excessively flow.

The low refractive index and organic high refractive index polymerizable compositions typically comprise at least 5 wt-% or 10 wt-% of crosslinker (i.e. a monomer having at least three (meth)acrylate groups). The concentration of crosslinker in the low refractive index composition is generally no greater than about 30 wt-%, or 25 wt-%, or 20 wt-%. The concentration of crosslinker in the high refractive index composition is generally no greater than about 15 wt-%.

Suitable crosslinker monomers include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl)isocyanurate triacrylate (from Sartomer under the trade designation "SR368"). In some aspects, a hydantoin moiety-containing multi-(meth)acrylates compound, such as described in U.S. Pat. No. 4,262,072 (Wendling et al.) is employed.

The high refractive index polymerizable composition typically comprises at least one aromatic (meth)acrylate monomer having two (meth)acrylate groups (i.e. a di(meth)acrylate monomer).

In some embodiments, the di(meth)acrylate monomer is derived from bisphenol A. One exemplary bisphenol-A ethoxylated diacrylate monomer is commercially available from Sartomer under the trade designations "SR602" (reported to have a viscosity of 610 cps at 20° C. and a Tg of 2° C.). Another exemplary bisphenol-A ethoxylated diacrylate monomer is as commercially available from Sartomer under the trade designation "SR601" (reported to have a viscosity of 1080 cps at 20° C. and a Tg of 60° C.). Various other bisphenol A monomers have been described in the art, such as those described in U.S. Pat. No. 7,282,272.

In other embodiments, the high refractive index layer and AR film is free of monomer derived from bisphenol A.

One suitable difunctional aromatic (meth)acrylate monomer is a biphenyl di(meth)acrylate monomer is described in US2008/0221291; incorporated herein by reference. The biphenyl di(meth)acrylate monomers may the general structure

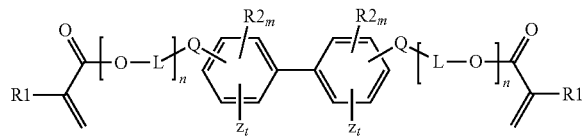

wherein each R1 is independently H or methyl;
each R2 is independently Br;
m ranges from 0 to 4;
each Q is independently O or S;
n ranges from 0 to 10;
L is a C2 to C12 alkyl group optionally substituted with one or more hydroxyl groups;
z is an aromatic ring; and
t is independently 0 or 1.

At least one, and preferably both, of the -Q[L-O]nC(O)C(R1)=CH$_2$ groups are substituted at the ortho or meta position such that the monomer is a liquid at 25° C.

Such biphenyl di(meth)acrylate monomer may be used alone or in combination with a triphenyl tri(meth)acrylate monomer such as described in WO2008/112452; incorporated herein by reference. WO2008/112452 also describes triphenyl mono(meth)acrylates and di(meth)acrylates that are also surmised to be suitable components for the high refractive index layer.

In some embodiments, the difunctional aromatic (meth)acrylate monomer is combined with an aromatic mono(meth)acrylate monomer having a molecular weight less than 450 g/mole and having a refractive index of at least 1.50, 1.51, 1.52, 1.53, 1.54, 1.55, 1.56, 1.57 or 1.58. Such reactive diluents typically comprise a phenyl, biphenyl, or naphthyl group. Further such reactive diluents can be halogenated or non-halogenated (e.g. non-brominated). The inclusion of reactive diluents, such as biphenyl mono(meth)acrylate monomers, can concurrently raise the refractive index of the organic component and improve the processability of the polymerizable composition by reducing the viscosity.

The concentration of aromatic mono(meth)acrylate reactive diluents typically ranges from 1 wt-% or 2 wt-% to about 10 wt-%. In some embodiments, the high refractive index layer comprises no greater than 9, 8, 7, 6, or 5 wt-% of reactive diluent(s). When excess reactive diluent is employed, the high refractive index layer as well as antireflective film can exhibit reduced pencil hardness. For example, when the sum of the monofunctional reactive diluents is no greater than about 7 wt-%, the pencil hardness is typically about 3H to 4H. However, when the sum of the monofunctional diluents exceeds 7 wt-%, the pencil hardness can be reduced to 2H or lower.

Suitable reactive diluents include for example phenoxy ethyl (meth)acrylate; phenoxy-2-methylethyl (meth)acrylate; phenoxyethoxyethyl (meth)acrylate, 3-hydroxy-2-hydroxypropyl (meth)acrylate; benzyl (meth)acrylate; phenylthio ethyl acrylate; 2-naphthylthio ethyl acrylate; 1-naphthylthio ethyl acrylate; 2,4,6-tribromophenoxy ethyl acrylate; 2,4-dibromophenoxy ethyl acrylate; 2-bromophenoxy ethyl acrylate; 1-naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; 2,4-dibromo-6-sec-butylphenyl acrylate; 2,4-dibromo-6-isopropylphenyl acrylate; benzyl acrylate; phenyl acrylate; 2,4,6-tribromophenyl acrylate. Other high refractive index monomers such as pentabromobenzyl acrylate and pentabromophenyl acrylate can also be employed.

One suitable diluent is phenoxyethyl acrylate (PEA). Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Benzyl acrylate is commercially available from AlfaAeser Corp, Ward Hill, Mass.

The method of forming an antireflective coating on an optical display or an antireflective film for use of an optical display may include providing a light transmissible substrate layer; providing a microstructured high refractive index material on the substrate layer; and providing the low index layer described herein coupled to the high refractive index layer. The low index layer may be provided by applying a layer of said low refractive index material onto said (e.g. cured) layer of said high refractive index material and irradiating with a sufficient ultraviolet radiation to crosslink. Alternatively, the low refractive index coating may be applied to a release liner, at least partially cured, and transfer coated. Further, the antireflection material may be applied directly to the substrate or alternatively applied to a release layer of a transferable antireflection film and subsequently transferred from the release layer to the substrate using a thermal or radiation-induced transfer. Suitable transfer methods are described in Published U.S. Application No. 2006/0147614.

The low refractive index composition and high refractive index composition can be applied directly to a film or display surface substrate using conventional film application techniques. Advantageously, a combination of low reflectance and good durability can be obtained with a single low refractive index layer provided on a single high refractive index layer.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, *Modern Coating and Drying Technology*, VCH Publishers, NY 1992, ISBN 3-527-28246-7 and Gutoff and Cohen, *Coating and Drying Defects: Troubleshooting Operating Problems*, Wiley Interscience, NY ISBN 0-471-59810-0.

The low index coatings are typically coated out of solvent; whereas the high index coatings are generally substantially solvent free. An inorganic low index coating, such as $SiO_2$, may alternatively be applied by vapor deposition.

The low refractive index coating composition is typically dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink.

The microstructured high index layer may be cured for example by exposure to ultraviolet radiation using an H-bulb or other lamp at a desired wavelength, preferably in an inert atmosphere (less than 50 parts per million oxygen). The reaction mechanism causes the free-radically polymerizable materials to crosslink. The cured microstructured layer may be dried in an oven to remove photoinitiator by-products or trace amount of solvent if present. Alternatively, a polymerizable composition comprising higher amounts of solvents can be pumped onto a web, dried, and then microreplicated and cured.

Although it is usually convenient for the substrate to be in the form of a roll of continuous web, the coatings may be applied to individual sheets.

The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion. Alternatively or in addition thereto the primer may be applied to reduce interference fringing, or to provide antistatic properties.

Various permanent and removable grade adhesive compositions may be provided on the opposite side of the film substrate. For embodiments that employ pressure sensitive adhesive, the antireflective film article typically include a removable release liner. During application to a display surface, the release liner is removed so the antireflective film article can be adhered to the display surface.

In some embodiments, the antireflective films described herein are durable. In one aspect, the durable antireflective films resist scratching after repeated contact with an abrasive material such as steel wool. The presence of significant scratching can increase the haze of the antireflective film. In one embodiment, the antireflective film has an increase in haze of less than 1.0% after 5, 10, 15, 20, or 25 wipes with steel wool using a 3.2 cm mandrel and a mass of 200 g, according to the Steel Wool Durability Test as further described in the examples.

Surface layers that resist visible scratching do not necessarily retain their low surface energy. The antireflective films can retain low surface energy after repeated contact with an abrasive material such as steel wool. The antireflective film may exhibit an advancing contact angle with hexadecane of at least 45 degrees, 50 degrees, or 60 degrees after 5, 10, 15, 20, or 25 wipes with steel wool using a 3.2 cm diameter mandrel and a mass of 1000 grams, according to the Steel Wool Durability Testing. The antireflective films typically also exhibit a static contact angle with water of at least 90 degrees, 95 degrees, or 100 degree after 10 wipes, 50 wipes, 100 wipes, 200 wipes, or even 300 wipes with steel wool using a 3.2 cm diameter mandrel and a mass of 200 grams.

EXAMPLES

Microstructured Surface Characterization

The following method was used to identify and characterize peak regions and of interest in height profiles that were obtained by atomic force microscopy (AFM), confocal scanning laser microscopy (CSLM), or phase shifting interferometry (PSI) by use of a Wyko Surface Profiler with a 10× objective, over an area ranging from about 200 microns by 250 microns to area of about 500 microns by 600 microns. The method uses thresholding on the curvature and an iterative algorithm to optimize the selection. Using curvature instead of a simple height threshold helps pick out relevant peaks that reside in valleys. In certain cases, it also helps avoid the selection of a single continuous network.

Prior to analyzing the height profiles, a median filter is used to reduce the noise. Then for each point in the height profile, the curvature parallel to the direction of the steepest slope (along the gradient vector) was calculated. The curvature perpendicular to this direction was also calculated. The curvature was calculated using three points and is described in the following section. Peak regions are identified by identifying areas that have positive curvature in at least one of these two directions. The curvature in the other direction cannot be too negative. To accomplish this, a binary image was created by using thresholding on these two curvatures. Some standard image processing functions were applied to the binary image to clean it up. In addition, peak regions that are too shallow are removed.

The size of the median filter and the distance between the points used for the curvature calculations are important. If they are too small, the main peaks may break up into smaller regions due to imperfections on the peak. If they are too large, relevant peaks may not be identified. These sizes were set to scale with the size of the peak regions or the width of the valley region between the peaks, whichever is smaller. However, the region sizes depend on the size of the median filter and the distance between the points for the curvature calculations. Therefore, an iterative process was used to identify a spacing that satisfies some preset conditions that result in good peak identification.

Slope and Curvature Analysis

Surface profile data gives height of the surface as a function of x and y positions. We will represent this data as a function $H(x,y)$. The x direction of the image is the horizontal direction of the image. The y direction of the image is the vertical direction of the image. MATLAB was used to calculate the following:

1. gradient vector $$\nabla H(x, y) = \left(\frac{\partial H(x, y)}{\partial x}, \frac{\partial H(x, y)}{\partial y}\right) = \left(\frac{H(x+\Delta x, y) - H(x-\Delta x, y)}{2\Delta x}, \frac{H(x, y+\Delta y) - H(x, y-\Delta y)}{2\Delta y}\right)$$

2. slope(in degrees)distribution– $N_G(\theta)$ $$\theta = \arctan(|\nabla H(x, y)|) = \arctan\left(\sqrt{\left(\frac{H(x+\Delta x, y) - H(x-\Delta x, y)}{2\Delta x}\right)^2 + \left(\frac{H(x, y+\Delta y) - H(x, y-\Delta y)}{2\Delta y}\right)^2}\right)$$

3. $F_{CC}(\theta)$ – complement cumulative distribution of the slope distribution $$F_{CC}(\theta) = \frac{\sum_{q=\theta}^{\infty} N_G(q)}{\sum_{q=0}^{\infty} N_G(q)}$$

$F_{cc}(\theta)$ is the complement of the cumulative slope distribution and gives the fraction of slopes that are greater than or equal to a $\theta$.

4. g-curvature, curvature in the direction of the gradient vector (inverse microns)
5. t-curvature, curvature in the direction transverse to the gradient vector (increase microns)

CL Curvature

Figure 12:
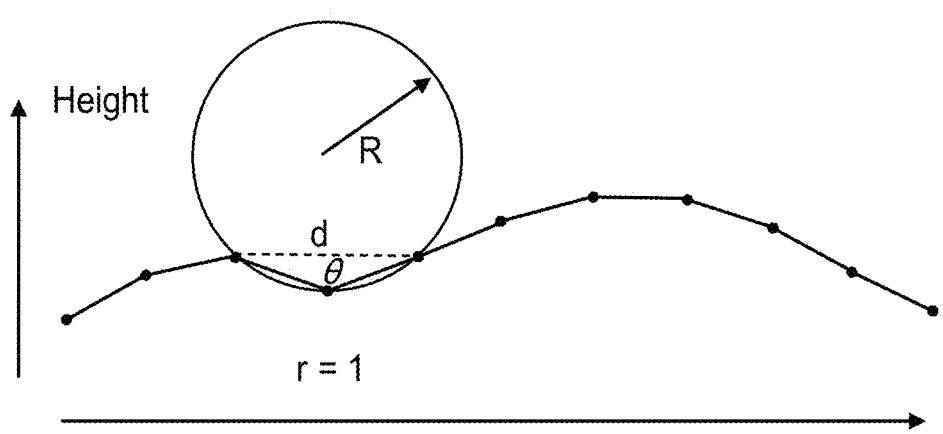
FIG. 12 depicts the manner in which curvature is calculated.

As depicted in FIG. 12, the curvature at a point is calculated using the two points used for the slope calculation and the center point. For this analysis, the curvature is defined as one divided by the radius of the circle that inscribes the triangle formed by these three points.

curvature=±1/R=±2*sin(θ)/d where θ is the angle opposite the hypotenuse, and d is the length of the hypotenuse of the triangle. The curvature is defined to be negative if the curve is concave up and positive if concave down.

The curvature is measured along the gradient vector direction (i.e. g-curvature) and along the direction transverse to the gradient vector (i.e. t-curvature). Interpolation is used to obtain the two end points.

Peak Sizing

The curvature profile is used to obtain size statistics for peaks on the surface of samples. Thresholding of the curvature profile is used to generate a binary image that is used to identify peaks. Using MATLAB, the following thresholding was applied at each pixel to generate the binary images for peak identification:

max(g-curvature,t-curvature)>c0max min(g-curvature,t-curvature)>c0min where c0max and c0min are curvature cutoff values. Typically, c0max and c0min were assigned as follows:

c0max=2 sin($q_0$)$N_0$/fov ($q_0$ and $N_0$ are fixed parameters)

c0min=-c0max $q_0$ should be an estimate of the smallest slope (in degrees) that is of significance. $N_0$ should be an estimate of the least number of peak regions that is desirable to have across the longest dimension of the field of view. fov is the length of the longest dimension of the field of view.

MATLAB with the image processing tool box was used to analyze the height profiles and generate the peak statistics. The following sequence gives an outline of the steps in the MATLAB code used to characterize peak regions.

1. If number of pixels>=1001*1001 then reduce number of pixels
    calculate nskip=fix(na*nb/1001/1001)+1
        original image has size na×nb pixels
    if nskip>1 then carry out (2*fix(nskip/2)+1)×(2*fix(nskip/2)+1) median averaging
        fix is a function that rounds down to the nearest integer.
    create new image keeping every nskip pixel in each direction (e.g. keep rows and columns 1, 4, 8, 11 . . . if nskip=3)
2. r=round(Δx/pix)
    Δx is the step size that will be used in the slope calculation
    pix is the pixel size.
    r is Δx rounded to the nearest whole numbers of pixels
    an initial value for Δx is chosen to be equal to ffov*fov.
        ffov is a parameter chosen by the user prior to running the program
3. Perform median averaging with window size of round($f_{MX}$*r)×round($f_{MY}$*r) pixels.
    If the regions are oriented then median averaging is done with a window with an aspect ratio (W/L) close to that of a typical region as defined below. The window aspect ratio is not allowed to go below the preset value rm_aspec_min.
    Note that if the regions are oriented, the height profiling should be performed with the sample aligned such that this orientation is along the x or y axis.
    For this analysis, the regions are considered oriented if mean orientation angle of the regions (weighted by region area) is less then 15 degrees or greater then 75 degrees.
        1. orientation angle is defined as the angle that the major axis of the ellipse associated with the region makes with the y-axis.

standard deviation of this orientation angle is less than 25 degrees
coverage is greater then 10%
If this is the first round or the regions are not oriented then
$f_{MX}$ and $f_{MY}$ is set equal to $f_M$
If the orientation is along the y-axis
$f_{MX}$=round($f_M$*r*sqrt(aspect));
$f_{MY}$=round($f_M$*r/sqrt(aspect));
If the orientation is along the x-axis
$f_{MX}$=round($f_M$*r/sqrt(aspect));
$f_{MY}$=round($f_M$*r*sqrt(aspect));
aspect=the mean aspect ratio weighted by region area
if it is less than rm_aspect_min, it is set equal to rm_aspect_min.
$f_M$ is a fixed parameter chosen before running the program.
4. Remove tilt.
effectively makes the average slope across the entire profile in all directions equal to zero
5. Calculate slope profiles as previously described.
6. Calculate curvature profiles in the direction parallel to the gradient vector (g-curvature) and in the direction transverse to the gradient vector (t-curvature).
7. Create a binary image using the curvature thresholding described above.
8. Erode the binary image.
the number of times the image is eroded is set equal to round(r*$f_E$)
$f_E$ is a fixed parameter (typically ≤1), chosen before initiating the program
this helps separate distinct regions that are connected by a narrow line and eliminate regions that are too small
9. Dilate the image.
the number of times the image is dialed is typically chosen to be the same number of times the image was eroded
10. Further dilate the image.
in this round, the image is dilated before being eroded
helps remove cul-de-sacs, round edges, and combine regions that are very close together
11. Erode the image.
the number of times the image is eroded is typically chosen to be the same number of times the image was dilated in the last step
12. Eliminate regions that are too close to the edge of the image.
typically, it is deemed too close if any part of the regions is within (nerode+2) of the edge, where nerode is the number of times the image was eroded in step 9
this eliminates regions that are only partially in the field of view
13. Fill in any holes in each region.
14. Eliminate regions with ECD (equivalent circular diameter)<2 sin($q_0$)$N_0$/fov.
$q_0$ and $N_0$ are parameter used in the curvature cutoff calculations.
this eliminates regions that are small compared to the hemisphere with radius R
these regions is likely to have slope variations within the region that is less than $q_0$
another filter to consider in place of this one is to eliminate regions with standard deviations in the slope less than a cutoff value
15. Then calculate a new value for r.
if number of peaks identified equals zero then reduce r by two and round up
go to step 4
new r=round($f_W$*$L_0$)
$f_W$ is a fixed parameter (typically ≤1), chosen before initiating the program
$L_0$ is a length defined in Table A1
if new r is less than $r_{MIN}$, set equal to $r_{MIN}$
if new r is greater than $r_{MAX}$, set equal to $r_{MAX}$
if r is unchanged or is repeated, this is the value for r that is chosen. Go to step 17.
if coverage drops by a factor of Kc or more or if the number of regions increases by a factor of Kn or more, then the previous value for r is chosen. Go to step 17.
if a value for r is not chosen, go to step 4.
16. For the r chosen, calculate the following dimensions for each region identified:
ECD, L, W, and aspect ratio.
17. Calculate the mean and standard deviation for each dimension.
18. Calculate coverage and NN (Table A2).

TABLE A1

| | Definitions for parameters |
|---|---|
| Δx | target step size that will be used in the slope calculations, actual step size is obtained by converting this to the nearest number of pixels |
| r | Δx rounded to the nearest number of pixels |
| $f_W$ | new r = round($f_W$ * $L_0$) |
| $L_0$ | length representing the typical size scale of the regions, distance between regions or diameter of curvature of the regions, whichever is smallest. $L_0$ = min ($W_0$, $W_1$, $D_0$). |
| $W_0$ | $W_0$ = $f_{W0}$*W + (1 − $f_{W0}$)*L |
| $W_1$ | $W_1$ = $W_0$*(coverage$^{-1/2}$ − 1) |
| $D_0$ | 10 percentile point for the diameter of curvature distribution (10% are less then this point) |
| $f_{W0}$ | parameter used to calculate $W_0$ |
| $f_E$ | the number of times the binary image is eroded = round(r * $f_E$) |
| $f_M$ | parameter that impacts the size of the window for median averaging |
| rm_aspect_min | lower limit for the width to length ratio of the median averaging window |
| fov | length of the longest dimension of the field of view |
| ffov | Initially Δx is either chosen by the user or set equal to ffov * fov typical values for ffov are 0.01 and 0.015 |
| c0max | c0max = 2sin($q_0$)$N_0$/fov curvature threshold for max(g-curvature, t-curvature) |
| c0min | c0min = −c0max curvature threshold for min(g-curvature, t-curvature) |
| $N_0$ | estimate of the least number of peak regions that is desirable to have across the longest dimension of the field of view |
| $q_0$ | estimate of the smallest slope (in degrees) that is of significance |
| $r_{MIN}$ | r is not allowed to go below this value |
| $r_{MAX}$ | r is not allowed to go above this value |
| Kc | If (new coverage) < (old coverage)/Kc then stop and keep old value for r |
| Kn | If (new number of regions) > (old number of regions) * Kn then stop and keep old value for r |

TABLE A2

| | Definitions for region dimensions |
|---|---|
| ECD | equivalent circular diameter (ECD) of a region |
| L | length of major axis of the ellipse that has the same normalized second central moments as the region |
| W | length of minor axis of the ellipse that has the same normalized second central moments as the region |

TABLE A2-continued

Definitions for region dimensions

| | |
|---|---|
| aspect ratio | W/L |
| NN | Equals one divided by the squareroot of the number of regions per unit area. Partial regions are included in this calculation. This is equal to the nearest neighbor distance between the center of the regions if the regions were arranged in a square lattice. |
| coverage | Equals the total area occupied by the regions divided by the total area of the image. Partial regions are included in this calculation. |

The dimensions were averaged over two height profiles.

Typical parameter settings were as follow:

ffov 0.015
$f_W$ ⅓
$f_M$ ⅔
$f_E$ 0.3
$f_{WO}$ ¾
Kc ½
Kn 2-4
rmin 2
rmax 50
rm aspect min ⅓
$N_0$ 4
$q_0$ ⅓-½

These parameter settings can be adjusted to insure that the major features (rather than minor features) are being identified.

Height Frequency Distribution

The minimum height value is subtracted from the height data so that the minimum height is zero. The height frequency distribution is generated by creating a histogram. The mean of this distribution is referred to as the mean height.

Roughness Metrics

Ra—Average roughness calculated over the entire measured array.

$$Ra = \frac{1}{MN}\sum_{i=1}^{M}\sum_{k=1}^{N}|Z_{jk}|$$

wherein $Z_{jk}$=the height of each pixel after the zero mean is removed.

Rz is the average maximum surface height of the ten largest peak-to-valley separations in the evaluation area, $$Rz = \frac{1}{10}[(H_1 + H_2 + \ldots + H_{10}) - (L_1 + L_2 + \ldots + L_{10})].$$

where H is a peak height and L is a valley height, and H and L have a common reference plane.

Each value reported for the complement cumulative slope distribution, peak dimensions, and roughness were based on an average of two areas. For a large film, such as a typical 17" computer display, an average of 5-10 randomly selected areas would typically be utilized.

High Refractive Index Hardcoat Compositions

Synthesis of biphenyl diacrylate-2,2'-Diethoxybiphenyl diacrylate (DEBPDA)

To a 12000 ml 4 neck resin head round bottom equipped with a temperature probe, nitrogen purge tube, an overhead stirrer and heating mantel was added 2,2'-biphenol (1415 g, 7.6 moles, 1.0 equivalents), potassium fluoride (11.8 g, 0.2 moles, 0.027 equivalents), ethylene carbonate (1415 g, 16.1 moles, 2.11 equivalents) and heated to 155° C. At 4.5 hours, GC analysis indicated 0% starting material, 0% monoethoxylated and 94% product. Cooled to 80° C., added toluene 5.4 liters, added 2.5 liters deionized water, mixed for 15 min and phase separated. Removed the water and washed again with 2.5 liters deionized water, phase separated, removed the water and distilled solution to remove residual water and approximately 1.8 liters of toluene. The solution was cooled to 50° C. and added cyclohexane 1.8 liters, 4-hydroxy-2,2,6,6-tetramethyl-1-piperidinyloxy obtained from CIBA Specialty Chemicals under the trade designation Prostab 5198, commonly referred to a 4-hydroxy TEMPO (0.52 g, 0.003 moles, 0.00044 equivalents), phenothiazine (0.52 g, 0.0026 moles, 0.00038 equivalents), acrylic acid (1089.4 g, 15.12 moles, 2.2 equivalents), methane sulfonic acid (36.3 g, 0.38 moles, 0.055 equivalents) and heated to reflux (pot temp was 92-95 C). The flask was equipped with a dean stark trap to collect water. After 18 hours GC analysis indicated 8% monoacrylate intermediate. Added an additional 8 g acrylic acid and continued refluxing for another 6 hours for a total of 24 hours. After 24 hours GC analysis indicated 3% monoacrylate intermediate. The reaction was cooled to 50° C. and treated with 2356 ml 7% sodium carbonate, stirred for 30 min, phase separated, removed aqueous, washed again with 2356 ml DI water, phase separated and removed aqueous. To the (pink-red) toluene/cyclohexane solution was added 4-hydroxy TEMPO (0.52 g, 0.003 moles, 0.00044 equivalents), phenothiazine (0.52 g, 0.0026 moles, 0.00038 equivalents), aluminum n-nitrosophenylhydroxylamine (0.52 g, 0.0012 moles, 0.00017 equivalents) and concentrated with vacuum to approximately 5000 ml solution. Filtered through a pad of celite and the filtrate was concentrated with vacuum with an air purge, at 50° C. and 12 torr vacuum for 3 hours. The resulting yellow to brown oil is further purified by distilling on a roll film evaporator. The conditions for distillation were heating the barrel at 155° C., condenser at 50° C. and 1-5 mtorr. The recovered yield was 2467 g (85% of theoretical) and purity was approximately 90% DEBPDA.

Synthesis of triphenyl triacrylate 1,1,1-Tris(4-acryloyloxyethoxyphenyl)ethane (TAEPE)

To a 1000 ml 3 neck round bottom equipped with a temperature probe, an overhead stirrer and heating mantel was added 1,1,1-tris(4-hydroxyphenyl)ethane (200 g, 0.65 moles, 1.0 equivalents), potassium fluoride (0.5 g, 0.0086 moles, 0.013 equivalents), ethylene carbonate (175 g, 2.0 moles, 3.05 equivalents) and heated to 165° C. At 5 hours, GC analysis indicated 0% starting material, 0% monoethoxylated, 2% diethoxylated, and 95% product. Cooled to 100° C., added toluene 750 ml, transferred to a 3000 ml 3 neck round bottom and added another 750 ml toluene. The solution was cooled to 50° C. and added, 4-hydroxy TEMPO (0.2 g, 0.00116 moles, 0.00178 equivalents), acrylic acid (155 g, 2.15 moles, 3.3 equivalents), methane sulfonic acid (10.2 g, 0.1 moles, 0.162 equivalents) and heated to reflux. The flask was equipped with a dean stark trap to collect water. After 6 hours GC analysis indicated 7% diacrylate intermediate and 85% product. The reaction was cooled to 50° C. and treated with 400 ml 7% sodium carbonate, stirred for 30 min, phase separated, removed aqueous, washed again with 400 ml 20% sodium chloride water, phase separated and removed aqueous. The organic was diluted with 4000 ml methanol, filtered through a 3 inch by 5 inch diameter pad of silica gel (250-400 mesh) and the filtrate was concentrated with vacuum with an air purge, at 50° C. and 12 torr vacuum for 3 hours. Recovered a brown oil 332 g (85% of theoretical) and purity was approximately 85% TAEPE.

Preparation of Zirconia Sol

The $ZrO_2$ sols used in the examples had the following properties (as measured according to the methods described in U.S. Pat. No. 7,241,437.

| Relative Intensities | | Apparent Crystallite Size (nm) | | | | | Weighted |
|---|---|---|---|---|---|---|---|
| Cubic/Tetragonal | Monoclinic | (C, T) (1 1 1) | M (-1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

% C/T = Primary particle size

Preparation of HEAS/DCLA Surface Modifier

A three neck round bottom flask is equipped with a temperature probe, mechanical stirrer and a condenser. To the flask is charged the following reagents: 83.5 g succinic anhydride, 0.04 g Prostab 5198 inhibitor, 0.5 g triethylamine, 87.2 g 2-hydroxyethyl acrylate, and 28.7 g hydroxy-polycaprolactone acrylate from Sartomer under the trade designation "SR495" (n average about 2). The flask is mixed with medium agitation and heated to 80° C. and held for ~6 hours. After cooling to 40° C., 200 g of 1-methoxy-2-propanol was added and the flask mixed for 1 hour. The reaction mixture was determined to be a mixture of the reaction product of succinic anhydride and 2-hydroxyethyl acrylate (i.e. HEAS) and the reaction product of succinic anhydride and hydroxy-polycaprolactone acrylate (i.e. DCLA) at a 81.5/18.5 by weight ratio according to infrared and gas chromatography analysis.

HEAS Surface Modifier—was produced by reacting succinic anhydride and 2-hydroxyethyl acrylate.

Preparation of HIHC 1

Zirconia sol (1000 g @ 45.3% solids) and 476.4 g 1-methoxy-2-propanol were charged to a 5 L round bottomed flask. The flask was set up for vacuum distillation and equipped with an overhead stirrer, temperature probe, heating mantle attached to a therm-o-watch controller. The zirconia sol and methoxy propanol were heated to 50° C. HEAS/DCLA surface modifiers (233.5 g @ 50% solids in 1-methoxy-2-propanol, HEAS/DCLA at an 81.5/18.5 by weight ratio), DEBPDA (120.5 g), 2-phenyl-phenyl acrylate (HBPA) commercially available from Toagosei Co. Ltd. of Japan. (50.2 g @ 46% solids in ethyl acetate), low viscosity trimethylolpropane triacrylate available from Sartomer under the trade designation "SR 351 LV" (85.3 g) and "ProStab 5198" (0.17 g) were charged individually to the flask with mixing. Therm-o-watch was set for 80° C. and 80% power. Water and solvents were removed via vacuum distillation until batch temperature reached 80° C. This process was repeated six times and then all six batches were combined into a 12 L round bottomed flask set up for vacuum distillation and equipped with a heating mantle, temperature probe/thermocouple, temperature controller, overhead stirrer and a steel tube for incorporating water vapor into the liquid composition. The liquid composition was heated to 80° C. at which time a water vapor stream at a rate of 800 ml per hour was introduced into the liquid composition under vacuum. Vacuum distillation with the vapor stream was continuous for 6 hours after which the vapor stream was discontinued. The batch was vacuum distilled at 80° C. for an additional 60 minutes. Vacuum was then broken using an air purge. Photoinitiator (17.7 g "Darocure 4265", a 50:50 mixture of diphenyl (2,4,6-trimethylbenzoyl)-phosphine oxide and 2-hydroxy-2-methyl-1-phenyl-1-propanone) was charged and mixed for 30 minutes. The resultant product was approximately 68% surface modified zirconia oxide in acrylate monomers having a refractive index of 1.6288.

Preparation of HIHC 2

Zirconia sol (5000 g @ 45.3% solids) and 2433 g 1-methoxy-2-propanol were charged to a 12 L round bottomed flask. The flask was set up for vacuum distillation and equipped with a heating mantle, temperature probe/thermocouple, temperature controller, overhead stirrer and a steel tube for incorporating water vapor into the liquid composition. The zirconia Sol and methoxy propanol were heated to 50° C. HEAS surface modifier (1056 g @ 50% solids in 1-methoxy-2-propanol, DEBPDA (454.5 g), HBPA (197 g @ 46% solids in ethyl acetate), SR 351 LV (317.1 g) and ProStab 5198 (0.69 g) were charged individually to the flask with mixing. Temperature controller was set for 80° C. Water and solvents were removed via vacuum distillation until batch temperature reached 80° C. at which time a water vapor stream at a rate of 800 ml per hour was introduced into the liquid composition under vacuum. Vacuum distillation with the vapor stream was continuous for 6 hours after which the vapor stream was discontinued and batch was vacuum distilled at 80° C. for an additional 60 minutes. Vacuum was then broken using an air purge. Photoinitiator (87.3 g Darocure 4265) was charged and mixed for 30 minutes. Resultant product was approximately 73% surface modified zirconia oxide in acrylate monomers having the following properties.

High Index Hardcoat Coating Compositions 3-9 were prepared in the same manner as HIHC 1 and HIHC 2. The (wt-% solids) of each of the components of the high index hardcoat were as follows.

| | HIHC 1 | HIHC 2 | HIHC 3 | HIHC 4 | HIHC 5 |
|---|---|---|---|---|---|
| $ZrO_2$ w/ HEAS and DCLA | 68 | | 70.9 | 68 | 68 |
| $ZrO_2$ w HEAS only | | 73* | | | |
| DEBPDA | 15.6 | 12.9 | 16.3 | 15.6 | 15.6 |
| HBPA | 3 | 2.6 | 3.1 | 3 | 3 |
| SR351 LV | 11.1 | 9 | 7.3 | 11.1 | 11.1 |
| Darocure 1173 | | | | 2.4 | 2.3 |

-continued

|  | HIHC 1 | HIHC 2 | HIHC 3 | HIHC 4 | HIHC 5 |
|---|---|---|---|---|---|
| Darocure 4265 | 2.3 | 2.5 |  |  | 2.3 |
| total | 100 | 100 | 100 | 100 | 100 |
| Viscosity** @60° C. | 0.77 | 1.73 | 4.06 | 1.44 | 1.88 |
| Viscosity @70° C. | 0.47 | 0.91 | 2.35 | 0.86 | 1.1 |
| Viscosity @80° C. |  | 0.54 |  |  |  |
| Refractive index @ 25° C. | 1.6288 | 1.645 | 1.6378 | 1.6244 | 1.6288 |

*73 wt-% surface modified $ZrO_2$ contains about 58 wt-% $ZrO_2$ and 15 wt-% surface modifier.

**Measured on a TA Instruments AR2000 with 60 mm 2 deg cone, temperature ramp from 80° C. to 45° C. at 2° C./min, shear rate 1/s. Viscosity units are pascal-seconds.

|  | HIHC 6 | HIHC 7 | HIHC 8 | HIHC 9 |
|---|---|---|---|---|
| $ZrO_2$ w/ HEAS and DCLA | 68 | 73 |  |  |
| $ZrO_2$ w/ HEAS only |  |  | 73 | 71.54 |
| DEBPDA |  |  | 12.9 | 12.6 |
| TAEPE |  |  | 6 | 0 |
| SR601 | 15.6 | 12.9 |  | 0 |
| HBPA | 3 | 2.6 | 2.6 | 4.6 |
| SR351 LV | 11.1 | 9 |  | 8.8 |
| SR339 |  |  | 3 | 0 |
| Darocure 1173 |  |  | 2.5 | 0 |
| Darocure 4265 | 2.3 | 2.5 |  | 2.5 |
| total | 100 | 100 | 100 | 100 |
| Viscosity @60° C. | 3.07 | 3.39 | 3.59 | 1.18 |
| Viscosity @70° C. | 1.61 | 1.96 | 1.69 | 0.64 |
| Viscosity @80° C. | 0.95 |  | 0.95 | 0.39 |
| Refractive index@25° C. | 1.6198 | 1.6252 | 1.6676 | 1.6439 |

SR601—trade designation of bisphenol-A ethoxylated diacrylate monomer is as commercially available from Sartomer (reported to have a viscosity of 1080 cps at 20° C. and a Tg of 60° C.).
Darocure 1173—2-hydroxy-2-methyl-1-phenyl-propan-1-one photoinitiator, commercially available from Ciba Specialty Chemicals.
SR399—trade designation of dipentaerythritolpentaacrylate commercially available from Sartomer.

Preparation of the Microstructured High Index Hard Coat

Examples H1, H2, H3, H2B, H2C

Handspread coatings were made using a rectangular microreplicated tool (4 inches wide and 24 inches long) preheated by placing them on a hot plate at 160° F. A "Catena 35" model laminator from General Binding Corporation (GBC) of Northbrook, Ill., USA was preheated to 160° F. (set at speed 5, laminating pressure at "heavy gauge"). The high index hardcoats were preheated in an oven at 60° C. and a Fusion Systems UV processor was turned on and warmed up (60 fpm, 100% power, 600 watts/inch D bulb, dichroic reflectors). Samples of polyester film were cut to the length of the tool (~2 feet). The high index hardcoat were applied to the end of the tool with a plastic disposable pipette, 4 mil (Mitsubishi O321E100W76) primed polyester was placed on top of the bead and tool, and the tool with polyester run through the laminator, thus spreading the coating approximately on the tool such that depressions of the tool were filled with the high refractive index hardcoat composition. The samples were placed on the UV processor belt and cured via UV polymerization. The resulting cured coatings were approximately 3-6 microns thick.

|  | HIHC formulation |
|---|---|
| H1 | HIHC3 |
| H2A | HIHC4 |
| H3 | HIHC1 |
| H2B | HIHC9 |
| H2C | HIHC8 |

A web coater was used to apply the other high index hardcoat coatings (18 inches in width) on 4 mil PET substrates. The other high index hardcoat coatings, except for H10A and H10B, were applied to primed PET available from Mitsubishi under the trade designation "4 mil Polyester film 0321 E100W76" at a tool temperature of 170° F., a die temperature of 160° F., and a high index hardcoat coating temperature of 160° F. High index hardcoat coatings H10A and H10B were applied to unprimed 4 mil polyester film available from 3M under the trade designation "ScotchPar" corona treated to 0.75 MJ/cm² at a tool temperature of 180° F., a die temperature of 170° F. for H10A and 180° F. for H10B; and a high index hardcoat coating temperature of 180° F. Before coating the substrate was also heated with an IR heater set at approximately 150-180° F. The high index hardcoat coatings were flood coated by creating a rolling bank of resin between the tool and nipped film. The coatings were UV cured at 50 to 100% power with a D bulb and dichoric reflectors. The resulting cured coatings were approximately 3-6 microns thick. Further process conditions are included in the following table.

| HIHC Coating | HIHC | Nip Pressure (psi) | Tool Temp (° F.) | Web Speed (rpm) | Resin Temp (° F.) | UV setting (% Power) | *Thickness (um) | IR Heater (° F.) |
|---|---|---|---|---|---|---|---|---|
| H6 | HIHC 5 | 80 | 170 | 40 | 160 | 100 | 4 to 5 | 160 |
| H8 | HIHC 5 | 80 | 170 | 40 | 160 | 100 | 4 to 5 | 160 |
| H9 | HIHC 5 | 80 | 170 | 40 | 160 | 100 | 4 to 5 | 160 |
| H4 | HIHC 1 | 80 | 170 | 40 | 160 | 50 | 3 to 5 | 160 |
| H5 | HIHC 5 | 80 | 170 | 40 | 160 | 100 | 4 to 5 | 160 |
| H5A | HIHC 7 | 80 | 170 | 40 | 160 | 100 | 4 to 5 | 160 |
| H6 | HIHC 5 | 80 | 170 | 40 | 160 | 100 | 4 to 5 | 160 |
| H7 | HIHC 5 | 80 | 170 | 40 | 160 | 100 | 4 to 5 | 160 |

-continued

| HIHC Coating | | Nip Pressure (psi) | Tool Temp (° F.) | Web Speed (rpm) | Resin Temp (° F.) | UV setting (% Power) | *Thickness (um) | IR Heater (° F.) |
|---|---|---|---|---|---|---|---|---|
| H10A | HIHC 6 | 80 | 180 | 25 | 146 | 100 | 3 to 5 | 180 |
| H10B | HIHC 2 | 80 | 180 | 25 | 180 | 100 | 4 to 5 | 180 |

*Approximate Thickness

The clarity, haze, and complement cumulative slope distribution of the microstructured high index hardcoat samples were characterized as previously described in Table 1. The dimensions of the peaks of the microstructured surface were also characterized as previously described in Table 2.

Low Index Compositions

Surface modified $SiO_2$ nanoparticles (HMDS/A174) silica were prepared as described in US 2007/0286994 A1 paragraph 0117.

L1 Component— was made by adding a free-radically polymerizable amorphous terpolymer of tetrafluoroethylene (TFE), vinylidene fluoride (VDF) and hexafluoropropylene (HFP), and a Br- and I-containing cure site monomer having 70 wt. % fluorine, available from Dyneon LLC of Oakdale, Minn. as "Dyneon FPO3740" (39.41 wt-% solids) to an amount of MEK while stirring to obtain a 5 wt-% solution. Then additional MEK was added while stirring to further dilute the concentration of FPO3740 to 3%. Next, a 19.9% (wt.) blend of HMDS/A174 Silica (34.38 wt-% solids) in MEK was added to the FPO3740/MEK blend while stirring. Next, a 20% (wt.) solution of dipentaerythritol pentaacrylate available from Sartomer as "SR399" mixed with MEK was added to the FPO/MEK/HMDS silica mixture. Finally, another fraction of MEK was added to dilute the total solids to 7% (wt). To this solution, an amount of benzil dimethyl ketal photoinitiator available under the trade designation "Esacure KB1" (Gallarate, Italy) (1.48 wt-% solids) pre-diluted in MEK at 10% (wt) was added. Additional MEK was added to further reduce the percent solids to 4%.

A hyperbranched fluoroacrylates (FPA) was prepared as described in WO 2007/146509 A1 using the following components.

| Material Description | Function (i.e., monomer, solvent, initiator, etc.) | Typical Percent Inputs |
|---|---|---|
| 2,3,3,3,4,4,5,5,-octafluoro-1,6-hexane diacrylate | Monomer | 3.91 |
| CN-4000 acrylate | Monomer | 1.08 |
| VAZO 52 | Initiator | 0.35 |
| Isooctyl thioglycoate | Chain transfer agent | 0.00005 |
| Ethyl acetate | Solvent | 37.61 |
| Methyl ethyl ketone | Solvent | 75.05 |

Tri 8F HDDA Michael adduct 2 was prepared as described in WO 2007/146509 A1 p 43 line 10.

L2 Component— was made by adding Sartomer CN4000 pre-dissolved at 10% (wt.) in ethyl acetate to a mixing vessel. Then, the components: hyperbranched fluoroacrylate (FPA) pre-dissolved at 5% (wt.) in ethyl acetate, Sartomer SR399 pre-dissolved in MEK at 10% (wt.), tri-8F HDDA pre-dissolved in butyl acetate at 5% (wt.) are added to the mixing vessel. Next, HMDS/A174 silica (30.5 wt-% solids) pre-dispersed in methyl isobutyl ketone at 33.5% (wt.) was added. Photoinitiator (oligo [2-hydroxy-2-methyl-1-[4-(1-methylvinyl)phenyl]propanone available as "Lamberti Esacure One") (3 wt-% solids pre-dissolved at 10% in MEK) was added to the mixing vessel. Finally, additional solvent was added to the formulation to bring it to 4% solids. The weight percent solids of the (i.e. cured) composition and solvent utilized in the coating composition are described in the forthcoming table.

Various blends were made from L1, L2, A1106, and fumed silica available as "Cab-O-Sil TS530", as described in the forthcoming tables.

L8 and L9 were made by adding Dyneon FPO3740 pre-dissolved in MEK at a concentration of 10% (wt.) to a mixing vessel. Then, the FPO3740 is further diluted with MEK and MIBK. To that mixture, Sartomer CN4000 pre-dissolved at 10% (wt.) and FPA37 pre-dissolved at 5% (wt.) both in ethyl acetate are added to the mixing vessel. Next, HMDS/A174 Silica pre-dispersed in methyl isobutyl ketone at 33.5% (wt.) and neat Sartomer SR494 is added to the mixing vessel. Finally, Lamberti Esacure One pre-dissolved at 10% (wt.) in MEK is added to the mixing vessel. Each of the components listed for L8 and L9 are added in the order described and at the concentrations in the table below.

When the low index composition also contained an oligomerized product of gamma-aminopropyl trimethoxysilane (available under the trade designation "A1106" from Momentive Performance Materials, Wilton, Conn.), such component, pre-diluted in methanol at 25% (wt), was slowly added to the formulation while stirring immediately prior to or up to 24 hours prior to coating. Additional MEK was added to reduce the % solids to 4% in preparation for coating. For each of the low index coating compositions, additional MEK was added such that each of the coating compositions were 4 wt-% solids.

| Component | L2 | L3 | L4 | L5 |
|---|---|---|---|---|
| Dyneon FPO3740 | | 0 | 27.61 | 27.65 |
| CN4000 | 15.25 | 14.56 | 4.59 | 4.37 |
| FPA | 15.25 | 14.56 | 4.59 | 4.37 |
| A1106 | | 4.77 | 3.43 | 5 |
| HMDS/A174 | 30.5 | 29.12 | 33.3 | 32.9 |
| SR399 | 15.25 | 14.56 | 18.38 | 18.19 |
| Tri 8F HDDA | 20.5 | 19.57 | 6.15 | 5.86 |
| KB1 | | 0 | 1.04 | 1.04 |
| Esacure 1 | 3.0 | 2.86 | 0.9 | 0.86 |
| Total | | 100 | 99.99 | 100.24 |
| MEK | 63.65 | 63.29 | 89 | 88.5 |
| EtOAc | 12.11 | 12.04 | 3.63 | 3.61 |
| MeOH | | 0.57 | 0.09 | 0.6 |
| MIBK | 2.98 | 2.96 | 0.89 | 0.88 |
| CHO | 5.09 | 5.06 | 1.53 | 1.52 |
| BuOAC | 16.156 | 16.06 | 4.85 | 4.82 |
| Total | 99.99 | 99.98 | 99.99 | 99.93 |
| Component | L6 | L7 | L8 | L9 |
| Dyneon FPO3740 | 19.71 | 28.46 | 30 | 30.77 |
| CN4000 | 7.65 | 4.5 | 5 | 10.69 |

|  |  |  |  |  |
|---|---|---|---|---|
| FPA | 7.65 | 4.5 | 10 | 10.69 |
| A1106 | 2.47 | 0 | 5 | 1.99 |
| HMDS/A174 | 32.49 | 33.87 | 33.5 | 28.84 |
| SR494 |  | 0 | 15 | 15.41 |
| SR399 | 17.48 | 18.72 | 0 | 0 |
| Tri 8F HDDA | 10.25 | 6.03 | 0 | 0 |
| KB1 | 0.74 | 1.07 | 0 | 0 |
| Esacure 1 | 1.5 | 0.88 | 1.5 | 1.59 |
| Cab-O-Sil TS530 |  | 2 | 0 | 0 |
| Total | 99.94 | 100.03 | 100 | 99.98 |
| % Solvents in the Coating Solution | | | | |
| MEK | 81.58 | 89 | 86.8 | 76.53 |
| EtOAc | 6.04 | 3.63 | 9.8 | 12.47 |
| MeOH | 0.3 | 0 | 0.6 | 0.25 |
| MIBK | 1.49 | 0.89 | 2.8 | 10.75 |
| CHO | 2.54 | 1.53 | 0 | 0 |
| BuOAC | 8.06 | 4.85 | 0 | 0 |
| Total | 100.01 | 99.9 | 100 | 100 |

Application of Low Index Composition to Microstructured High Index Hardcoat

Each antireflective layer "F" was prepared from a microstructured high refractive index layer "H" having the same numerical designation. Hence, F1 was prepared from H1 further comprising a low refractive index layer. Likewise, F11 was prepared from H11 further comprising a low refractive index layer.

F1, F2A1, F2A2, F3, F10A, F2B, and F2C—

Handspread coatings (4 inch width) were made by applying a bead of the low index coating with a disposable pipette to one end of a 6 inch by 12 inch sample of the respective, previously prepared and cured microreplicated high index hardcoat and a Webster #4 wire wound rod (mayer bar) was pulled across the bead the length of the film to create a uniform wet coating on the microstructured high index hardcoat. All low index formulations were dried in the oven (1 minute, 60 deg C.) and cured at 30 fpm (2 pass) in a Fusion Systems UV processor (nitrogen purge, 600 watts/inch H bulb, 100% power) resulting in approximately 100 nm of dried low index coating.

|  | LI Solution |
|---|---|
| F1 | L6 |
| F2A1 | L2 |
| F2A2 | L3 |
| F2 | L5 |
| F10A | L7 |
| F2B | L9 |
| F2C | L9 |

A web coater was used to apply the other low index formulations using either a syringe-pump or pressure pot at a web speed of 30 feet/per/minute. When utilizing the pressure pot, the solutions were passed through a filter (0.5 micron) before the die. The coatings were then applied onto a cured high refractive index coating on a polyester substrate and dried by passing through an oven for approximately 1 minute, set at approximately 120 F. The coatings were then cured with a UV system with a H bulb, aluminum reflector, at 100% power, under Nitrogen (oxygen<50 ppm). Further process conditions are included in the table.

|  | LI Solution | Pump type | Flowrate (ml/min) | Caliper (nm) | Coating Width (in.) |
|---|---|---|---|---|---|
| F6 | L4 | syringe | 4.6 | 536 | 4 |
| F8 | L4 | syringe | 4.6 | 548 | 4 |
| F9 | L4 | syringe | 4.6 | 559 | 4 |
| F4 | L4 | syringe | 5 | 614 | 4 |
| F5 | L4 | syringe | 4.6 | 547 | 4 |
| F10B | L8 | Pressure Pot | 12.3 | 537 | 8 |

The resulting cured low index layers were approximately 90 to 100 nanometers thick.

What is claimed is:

1. An antireflective film comprising a high refractive index layer and a low refractive index surface layer disposed on the high refractive index layer; wherein the low refractive index layer comprises a plurality of microstructures having a complement cumulative slope magnitude distribution such that at least 30% have a slope magnitude of at least 0.7 degrees, at least 25% have a slope magnitude less than 1.3 degrees, wherein the microstructures comprise peaks having a mean equivalent circular diameter of at least 5 microns and less than 30 microns and the antireflective film is free of microstructures comprising embedded matte particles, the embedded matte particles having a particle size greater than 0.25 microns.

2. The antireflective film of claim 1 wherein at least 30% of the microstructures have a slope magnitude of less than 1.3 degrees.

3. The antireflective film of claim 1 wherein at least 35% of the microstructures have a slope magnitude of less than 1.3 degrees.

4. The antireflective film of claim 1 wherein at least 40% of the microstructures have a slope magnitude of less than 1.3 degrees.

5. The antireflective film of claim 1 wherein less than 15% of the microstructures have a slope magnitude of 4.1 degrees or greater.

6. The antireflective film of claim 1 wherein less than 5% of the microstructures have a slope magnitude of 4.1 degrees or greater.

7. The antireflective film of claim 1 wherein at least 75% of the microstructures have a slope magnitude of at least 0.3 degrees.

8. The antireflective film of claim 1 wherein the film has an average maximum surface height (Rz) of less than 1.20 microns.

9. The antireflective film of claim 1 wherein the antireflective film has a clarity of at least 70%.

10. The antireflective film of claim 1 wherein the antireflective film has a haze of no greater than 10%.

11. The antireflective film of claim 1 wherein the antireflective film has a haze ranging from 1% to 10%.

12. The antireflective film of claim 1 wherein the antireflective film has an average photopic reflection of less than 2% at a wavelength of 550 nm.

13. The antireflective film of claim 1 wherein the high refractive index layer comprises the reaction product of a polymerizable resin composition having a refractive index of at least 1.60.

14. The antireflective film of claim 13 wherein the polymerizable resin composition comprises nanoparticles having a refractive index of at least 1.60.

15. The antireflective film of claim 14 wherein the nanoparticles comprise zirconia.

16. The antireflective film of claim 1 wherein the low refractive index layer comprises a free-radically polymerizable fluorinated polymer that comprises polymeric species having a hyperbranched structure.

17. The antireflective film of claim 16 wherein the free-radically polymerizable fluorinated polymer comprises the reaction product of i) at least one multi-functional free-radically polymerizable material having a fluorine content of at least 25 wt-%, and ii) optionally at least one multi-functional free-radically polymerizable material having a fluorine content ranging from 0 to less than 25 wt-%, wherein the total amount of multi-functional materials is at least about 25 wt-% based on wt-% solids of the polymerizable organic composition.

18. The antireflective film of claim 1 wherein the low refractive index layer comprises a free-radically polymerizable fluorinated polymer that comprises at least two constituent monomers selected from tetrafluoroethylene, vinylidene fluoride, and hexafluoropropylene, and has reactive functionality from at least one halogen containing cure site monomer.

19. The antireflective film of claim 1 wherein the low refractive index layer comprises the reaction product of a first free-racially polymerizable fluorinated polymer comprising polymeric species having a hyperbranched structure; and a second free-radically polymerizable fluorinated polymer that comprises at least two constituent monomers selected from tetrafluoroethylene, vinylidene fluoride, and hexafluoropropylene, and has reactive functionality from at least one halogen containing cure site monomer.

20. An antireflective film comprising a high refractive index layer and a low refractive index surface layer disposed on the high refractive index layer; wherein the low refractive index layer comprises a plurality of microstructures having a complement cumulative slope magnitude distribution such that at least 25% have a slope magnitude of at least 0.7 degrees, at least 40% have a slope magnitude less than 1.3 degrees, wherein the microstructures comprise peaks having a mean equivalent circular diameter of at least 5 microns and less than 30 microns and no greater than 50% of the microstructures comprise embedded matte particles, the embedded matte particles having a particle size greater than 0.25 microns.

* * * * *